United States Patent
Morishita et al.

(10) Patent No.: US 10,040,336 B2
(45) Date of Patent: Aug. 7, 2018

(54) HEAT-PUMP-TYPE VEHICLE AIR CONDITIONING SYSTEM AND DEFROSTING METHOD THEREOF

(71) Applicant: MITSUBISHI HEAVY INDUSTRIES AUTOMOTIVE THERMAL SYSTEMS CO., LTD., Kiyosu-shi, Aichi (JP)

(72) Inventors: Masatoshi Morishita, Tokyo (JP); Toshiyuki Ishida, Tokyo (JP)

(73) Assignee: MITSUBISHI HEAVY INDUSTRIES AUTOMOTIVE THERMAL SYSTEMS CO., LTD., Kiyosu-Shi (JP)

( * ) Notice: Subject to any disclaimer, the term of this patent is extended or adjusted under 35 U.S.C. 154(b) by 156 days.

(21) Appl. No.: 14/787,932

(22) PCT Filed: Apr. 15, 2014

(86) PCT No.: PCT/JP2014/060734
§ 371 (c)(1),
(2) Date: Oct. 29, 2015

(87) PCT Pub. No.: WO2015/004967
PCT Pub. Date: Jan. 15, 2015

(65) Prior Publication Data
US 2016/0075212 A1    Mar. 17, 2016

(30) Foreign Application Priority Data

Jul. 11, 2013 (JP) .................................. 2013-145648

(51) Int. Cl.
*B60H 1/32* (2006.01)
*B60H 1/22* (2006.01)
(Continued)

(52) U.S. Cl.
CPC ........... *B60H 1/22* (2013.01); *B60H 1/00778* (2013.01); *B60H 1/00785* (2013.01);
(Continued)

(58) Field of Classification Search
CPC .. B60H 1/22; B60H 1/00778; B60H 1/00785; B60H 1/00899; B60H 1/0921;
(Continued)

(56) References Cited

U.S. PATENT DOCUMENTS

2003/0037562 A1* 2/2003 Honda ............... B60H 1/00907
62/324.1
2013/0019615 A1* 1/2013 Choi ........................ B60H 1/00
62/79
2013/0139528 A1* 6/2013 Katayama .......... B60H 1/00921
62/81

FOREIGN PATENT DOCUMENTS

CN 202511534 U 10/2012
CN 102958724 A 3/2013
(Continued)

OTHER PUBLICATIONS

Office Action dated Jan. 25, 2017 for corresponding Chinese Patent Application No. 201480025814.9 with an English Translation.

*Primary Examiner* — Elizabeth Martin
(74) *Attorney, Agent, or Firm* — Birch, Stewart, Kolasch & Birch, LLP

(57) ABSTRACT

A heat pump vehicle air conditioning system passes hot gas to a condenser and a vaporizer for the vehicle cabin exterior. Even with low outside air temperature, it can efficiently defrost using the cooling cycle. The system includes a cabin-interior condenser downstream of a cabin-interior vaporizer within an HVAC unit connected via refrigerant switching means to a cooling cycle. Cooling is accomplished by a compressor, cabin-exterior condenser, first decompression unit with on-off valve function, the cabin-
(Continued)

interior vaporizer, and an accumulator. A cabin-exterior vaporizer disposed outside of the vehicle cabin is connected with a second decompression unit via an on-off valve function and to the exit-side liquid refrigerant pipe of the cabin-exterior condenser. A bypass circuit having a third decompression unit with on-off function is connected between the accumulator and the exit-side liquid refrigerant pipe of the cabin-exterior condenser.

7 Claims, 15 Drawing Sheets

(51) Int. Cl.
*B60H 1/00* (2006.01)
*F25B 41/04* (2006.01)
*F25B 47/02* (2006.01)

(52) U.S. Cl.
CPC ..... *B60H 1/00899* (2013.01); *B60H 1/00921* (2013.01); *F25B 41/04* (2013.01); *F25B 47/022* (2013.01); *F25B 2341/0683* (2013.01); *F25B 2400/0409* (2013.01); *F25B 2400/0411* (2013.01)

(58) Field of Classification Search
CPC ...... F25B 41/04; F25B 47/022; F25B 4/0224; F25B 2341/0683; F25B 2400/0409; F25B 2400/04117
See application file for complete search history.

(56) References Cited

FOREIGN PATENT DOCUMENTS

| | | | |
|---|---|---|---|
| JP | 7-9844 A | | 1/1995 |
| JP | 2000-203249 A | * | 1/1999 |
| JP | 2000-203249 A | | 7/2000 |
| JP | 2000-313224 A | | 11/2000 |
| JP | 2011-225187 A | | 11/2011 |
| JP | 2012-158197 A | | 8/2012 |
| WO | WO 2012/060132 A1 | | 5/2012 |

\* cited by examiner

HEAT-PUMP-TYPE VEHICLE AIR CONDITIONING SYSTEM AND DEFROSTING METHOD THEREOF

TECHNICAL FIELD

The present invention relates to a heat-pump-type vehicle air conditioning system and a defrosting method thereof that can be applied to the air conditioning device of an electric vehicle, hybrid vehicle, or the like.

BACKGROUND ART

In vehicle air conditioning systems, electric vehicles (EV) cannot use the waste heat of the engine for cabin heating. In hybrid vehicles (HEV, PHEV) also, engines are controlled to be stopped as much as possible for fuel economy, so the adoption of heat pump cabin heating systems using a refrigerant and heating systems using an electric heater with coolant as a medium is being investigated. In particular, for cabin heating operation, the power consumption is large, so it is desirable to use a heat pump system that can achieve high COP cabin heating (in the case of an electric heater, COP≤1).

On the other hand, in the case of heat pump systems, when operating cabin heating under low outside air temperature conditions, frosting can occur on the vehicle-cabin-exterior heat exchanger (evaporator), resulting in a reduction in the quantity of heat absorbed from the external air, which has the problem that the cabin heating performance is reduced. Therefore, it is necessary to defrost the vehicle-cabin-exterior heat exchanger (evaporator), but if a defrosting system adapted for building heat pump air conditioning apparatus is adopted, cabin heating operation cannot be continued. In the case of a vehicle air conditioning device, if the cabin heating operation is stopped, the windows become fogged and safety cannot be ensured, so there is a problem that it is difficult to carry out defrosting operation while driving.

Therefore, Patent Document 1 provided a heat-pump-type vehicle air conditioning system ideal for use in EV vehicles or in HEV or PHEV vehicles and the like, that uses an existing vehicle air conditioning device cabin cooling cycle, and that by adding the minimum cabin heating circuit and equipment thereto, can resolve the problem of frosting of the vehicle-cabin-exterior vaporizer at low cost. This system connects a vehicle-cabin-interior condenser provided on the downstream side of the vehicle-cabin-interior vaporizer within the HVAC unit of the cabin cooling cycle of an existing system, and connects a vehicle-cabin-exterior vaporizer outside the vehicle cabin to configure a heat pump cycle for cabin heating. When frosting is detected on the vehicle-cabin-exterior vaporizer during cabin heating operation, the refrigerant to the vehicle-cabin-exterior vaporizer is cut off and refrigerant is passed to the vehicle-cabin-interior vaporizer side, and by switching to dehumidifying heating, operation can be continued.

CITATION LIST

Patent Literature

Patent Literature 1: Japanese Unexamined Patent Application Publication No. 2012-158197A

SUMMARY OF INVENTION

Technical Problem

In the invention described in Patent Document 1, when frost forms on the vehicle-cabin-exterior vaporizer during cabin heating operation, refrigerant is passed to the vehicle-cabin-interior vaporizer side, and by switching to dehumidifying heating operation, operation can be continued. During the dehumidifying heating either the vehicle-cabin-interior vaporizer is naturally defrosted, or after the vehicle is stopped, defrosting operation is carried out when the driver is not present and either when the vehicle battery is being charged or after it has been charged.

However, during the defrosting operation, it is not possible to carry out defrosting by introducing hot gas directly to the vehicle-cabin-exterior vaporizer. Accordingly, the system is that heat is absorbed by the vehicle-cabin-interior vaporizer and dissipated in the vehicle-cabin-interior condenser, and the hot air is passed to the vehicle-cabin-exterior vaporizer. Therefore, when the outside air temperature is low, the amount of heat absorption is insufficient and not only is it not possible to carry out the defrosting operation efficiently in a short period of time, but also when the outside air temperature is 0° C. or less, there is the problem that sometimes defrosting is difficult.

In light of the foregoing, an object of the present invention is to provide a heat-pump-type vehicle air conditioning system and a defrosting method thereof that passes hot gas to both a vehicle-cabin-exterior condenser and a vehicle-cabin-exterior vaporizer during a defrosting operation, and that, even during times of low outside air temperatures, can efficiently defrost in a short period of time and can use the cabin cooling cycle of an existing air conditioning system as-is.

Solution to Problem

In order to resolve the above-described problems, the heat-pump-type vehicle air conditioning system and defrosting method thereof of the present invention provides the following.

Namely, the heat-pump-type vehicle air conditioning system according to one aspect of the present invention includes: a refrigeration cycle for cabin cooling in which an electric compressor, a vehicle-cabin-exterior condenser, a first decompression unit with on-off valve function, a vehicle-cabin-interior vaporizer provided within a HVAC unit, and an accumulator are connected in this order; a vehicle-cabin-interior condenser provided on the downstream side of the vehicle-cabin-interior vaporizer within the HVAC unit, and having a refrigerant inlet connected to a discharge circuit of the electric compressor via refrigerant switching means, and a refrigerant outlet connected to a liquid refrigerant pipe on an outlet side of the vehicle-cabin-exterior condenser; a vehicle-cabin-exterior vaporizer having a refrigerant inlet connected to an exit-side liquid refrigerant pipe of the vehicle-cabin-exterior condenser via a second decompression unit with on-off valve function, and a refrigerant outlet connected to the accumulator; and a bypass circuit that includes a third decompression unit with on-off valve function connected between the exit-side liquid refrigerant pipe of the vehicle-cabin-exterior condenser and the accumulator. A heat pump cycle for cabin heating can be configured from the electric compressor, the refrigerant switching means, the vehicle-cabin-interior condenser, the liquid refrigerant pipe, the second decompression unit with on-off valve function, the vehicle-cabin-exterior vaporizer, and the accumulator. During cabin heating operation, when the vehicle-cabin-exterior vaporizer is frosted, a first defrosting circuit that defrosts the vehicle-cabin-exterior condenser can be configured by circulating hot gas refrigerant from the electric compressor through the bypass circuit that includes the vehicle-cabin-exterior condenser, the liquid refrigerant pipe, and the third decompression unit with on-off valve function, and the accumulator via the refrigerant switching means; and a second defrosting circuit that defrosts the vehicle-cabin-exterior vaporizer can be configured by circulating hot gas refrigerant from the electric compressor through the vehicle-cabin-exterior condenser, the liquid refrigerant pipe, the second decompression unit with on-off valve function, the vehicle-cabin-exterior vaporizer, and the accumulator via the refrigerant switching means.

According to the aspect as described above, to a cycle for cabin cooling that includes the electric compressor, the vehicle-cabin-exterior condenser, the receiver, the first decompression unit with on-off valve function, the vehicle-cabin-interior vaporizer, and the accumulator, is connected: the vehicle-cabin-interior condenser installed on the downstream side of the vehicle-cabin-interior vaporizer within the HVAC unit via the refrigerant switching means; the vehicle-cabin-exterior vaporizer installed outside the vehicle cabin on the exit side refrigerant pipe of the vehicle-cabin-exterior condenser via the second decompression unit with on-off valve function; and the bypass circuit having the third decompression unit with on-off valve function connected between the exit-side liquid refrigerant pipe of the vehicle-cabin-exterior condenser and the accumulator. Therefore, a heat pump cycle for cabin heating can be configured from the electric compressor, the refrigerant switching means, the vehicle-cabin-interior condenser, the liquid refrigerant pipe, the second decompression unit with on-off valve function, the vehicle-cabin-exterior vaporizer, and the accumulator. Likewise, during cabin heating operation, two defrosting circuits can be configured: a first defrosting circuit that defrosts snow and ice and the like on the vehicle-cabin-exterior condenser and a second defrosting circuit that defrosts the vehicle-cabin-exterior vaporizer. The first defrosting circuit can be configured by circulating hot gas refrigerant from the electric compressor through the bypass circuit that includes the vehicle-cabin-exterior condenser, the liquid refrigerant pipe, and the third decompression unit with on-off valve function, and the accumulator via the refrigerant switching means. The second defrosting circuit can be configured by circulating hot gas refrigerant from the electric compressor through the vehicle-cabin-exterior condenser, the liquid refrigerant pipe, the second decompression unit with on-off valve function, the vehicle-cabin-exterior vaporizer, and the accumulator via the refrigerant switching means. Therefore, the vehicle-cabin-exterior condenser and the vehicle-cabin-exterior vaporizer can be efficiently defrosted in a short period of time even under low outside air temperature conditions by introducing hot gas refrigerant output from the electric compressor to the vehicle-cabin-exterior condenser and the vehicle-cabin-exterior vaporizer via the first defrosting circuit and the second defrosting circuit respectively, when the vehicle-cabin-exterior vaporizer is frosted or snow or ice or the like is adhering to the vehicle-cabin-exterior condenser as a result of cabin heating operation during low outside temperature conditions. Moreover, virtually all the refrigerant circuit of the current air conditioning systems can be used as they are. Therefore, by adding the minimum cabin heating circuit and equipment, the highly reliable and high-efficiency heat-pump-type vehicle air conditioning system with the comparatively simple configuration, low cost, excellent mountability and that can be ideally adopted for EV vehicles, HEV, and PHEV vehicles and the like can be provided.

In the above heat-pump-type vehicular air-conditioning system, during cabin heating operation by the heat pump cycle for cabin heating, when frosting of the vehicle-cabin-exterior vaporizer is detected, cabin heating operation may be continued by switching to a hot gas cycle in which refrigerant that has been condensed after releasing heat in the vehicle-cabin-interior condenser is passed through the bypass circuit that includes the third decompression unit with on-off valve function and is introduced into the accumulator, and absorbed into the electric compressor.

According to the above aspect, during cabin heating by the heat pump cycle for cabin heating, when frosting of the vehicle-cabin-exterior vaporizer is detected, cabin heating operation can be continued by switching to the hot gas cycle in which refrigerant that has been condensed after releasing heat in the vehicle-cabin-interior condenser is passed through the bypass circuit that includes the third decompression unit with on-off valve function and is introduced into the accumulator, and absorbed into the electric compressor. Therefore, cabin heating operation can be continued as it is by switching to the hot gas cycle, even though the vehicle-cabin-exterior vaporizer is frosted as a result of the cabin heating operation under low outside air temperature conditions, and heat pump cabin heating is difficult using the outside air as a heat source. Therefore, the occurrence of fogging of the windows as a result of stopping the cabin heating operation is avoided, and it is possible to ensure the cabin heating effect and safety.

In the heat-pump-type vehicular air-conditioning system as described above, a receiver may be provided on the exit-side liquid refrigerant pipe of the vehicle-cabin-exterior condenser, and the first decompression unit with on-off valve function on the inlet side of the vehicle-cabin-interior vaporizer may be a solenoid valve-equipped temperature-driven automatic expansion valve.

According to this aspect, the receiver is provided on the exit side refrigerant pipe of the vehicle-cabin-exterior condenser, and the first decompression unit with on-off valve function provided on the inlet side of the vehicle-cabin-interior vaporizer is a solenoid valve-equipped temperature-driven automatic expansion valve. Therefore, the temperature-driven automatic expansion valve can be used in combination with the receiver, so the evaporation performance of the vehicle-cabin-interior vaporizer can be stabilized, the controllability and reliability thereof can be ensured, the cabin cooling performance can be increased, and the configuration around the HVAC unit 2 where the solenoid valve-equipped temperature-driven automatic expansion valve is installed and the control system thereof can be simplified.

In any of the heat-pump-type vehicle air conditioning systems as described above, a dehumidification mode may be selected when the refrigerant is being circulated in the heat pump cycle for cabin heating by opening the on-off valve function of the first decompression unit with on-off valve function on the inlet side of the vehicle-cabin-interior vaporizer, and closing either both the vehicle-cabin-interior vaporizer and the vehicle-cabin-exterior vaporizer or the second decompression unit with on-off valve function so that the refrigerant flows into the vehicle-cabin-interior vaporizer.

According to this aspect, in the state in which the refrigerant is circulated in the heat pump cycle for cabin heating, by opening the on-off valve function of the first decompression unit with on-off valve function on the inlet side of the vehicle-cabin-interior vaporizer, and closing both the vehicle-cabin-interior vaporizer and the vehicle-cabin-exterior vaporizer or the second decompression unit with on-off valve function so that refrigerant flows only to the vehicle-cabin-interior vaporizer, the dehumidification mode can be selected. Therefore, during cabin cooling or cabin heating operation, the dehumidification mode can be selected if necessary, and it is possible to switch to dehumidification operation in which the vehicle-cabin-interior condenser functions as a heat radiator and either both the vehicle-cabin-exterior vaporizer and the vehicle-cabin-interior vaporizer or the vehicle-cabin-interior vaporizer only function as evaporator, and carry out temperature adjustment control. Therefore, during cabin cooling or cabin heating operation, it is possible to switch as appropriate to dehumidification mode and control the temperature adjustment, and execute comfortable dehumidification operation. During this dehumidification operation, by using both the vehicle-cabin-exterior vaporizer and the vehicle-cabin-interior vaporizer, the temperature linearity performance (the capability of tracking the setting temperature) can be improved.

In any of the heat-pump-type vehicle air conditioning systems as described above, the vehicle-cabin-exterior vaporizer may be disposed in the air flow path of a vehicle-cabin-exterior fan of the vehicle-cabin-exterior condenser on the downstream side of the vehicle-cabin-exterior condenser, and configured so that during defrosting operation using the first defrosting circuit and the second defrosting circuit, the vehicle-cabin-exterior fan is stopped.

According to this aspect, the vehicle-cabin-exterior vaporizer is disposed in the air flow path of the vehicle-cabin-exterior fan of the vehicle-cabin-exterior condenser on the downstream side of the vehicle-cabin-exterior condenser, and during defrosting operation using the first defrosting circuit and the second defrosting circuit the vehicle-cabin-exterior fan is stopped. Therefore, the vehicle-cabin-exterior fan is used in common by both the vehicle-cabin-exterior condenser and the vehicle-cabin-exterior vaporizer, so the configuration of the system can be simplified and the cost is reduced. Also, the vehicle-cabin-exterior condenser and the vehicle-cabin-exterior vaporizer are defrosted by heating from the interior with hot gas refrigerant, so during defrosting operation using the first defrosting circuit and the second defrosting circuit, defrosting can be carried out with the vehicle-cabin-exterior fan stopped, and the power consumption for the defrosting operation can be reduced.

In the defrosting method of any of the heat-pump-type vehicle air conditioning systems as described above, when the vehicle-cabin-exterior vaporizer is frosted, defrosting snow or frozen water that has been sprayed up adhering to the vehicle-cabin-exterior condenser side is carried out via the first defrosting circuit using hot gas refrigerant, then by switching to the second defrosting circuit, defrosting the frost of the vehicle-cabin-exterior vaporizer with hot gas refrigerant is carried out.

According to this aspect, during defrosting operation, after the snow or frozen water that has been sprayed up and is adhering to the vehicle-cabin-exterior condenser has been defrosted by the first defrosting circuit using the hot gas refrigerant, the circuit is switched to the second defrosting circuit, and the frosting of the vehicle-cabin-exterior vaporizer is defrosted by the hot gas refrigerant. Therefore, hot gas refrigerant is fed in a concentrated manner separately to the vehicle-cabin-exterior condenser and the vehicle-cabin-exterior vaporizer, so they can be successively defrosted. Therefore, even under low outside air temperature conditions, the vehicle-cabin-exterior condenser and the vehicle-cabin-exterior vaporizer can be efficiently defrosted in a short period of time.

In the defrosting method of a heat-pump-type vehicular air-conditioning system as described above, the defrosting operation may be carried out after the vehicle has stopped while the vehicle battery is being charged or after it has been charged, and the vehicle-cabin-exterior fan is stopped.

According to this aspect, the defrosting operation is carried out after the vehicle has stopped, and while the vehicle battery is being charged or after it has been charged and with the vehicle-cabin-exterior fan stopped. Therefore, it is possible to avoid the effect of the defrosting operation on the distance that the vehicle is driven, and the defrosting operation can be carried out when the vehicle battery is being charged or after it has been charged when there is spare battery capacity. Therefore, the vehicle-cabin-exterior condenser and the vehicle-cabin-exterior vaporizer can be defrosted efficiently and reliably and with reduced power consumption, without affecting the driver in any way.

Advantageous Effects of Invention

According to the heat-pump-type vehicle air conditioning device of the present invention, the vehicle-cabin-exterior condenser and the vehicle-cabin-exterior vaporizer can be efficiently defrosted in a short period of time even under low outside air temperature conditions by introducing hot gas refrigerant output from the electric compressor to the vehicle-cabin-exterior condenser and the vehicle-cabin-exterior vaporizer via the first defrosting circuit and the second defrosting circuit respectively, when the vehicle-cabin-exterior vaporizer is frosted or snow or ice or the like is adhering to the vehicle-cabin-exterior condenser as a result of cabin heating operation during low outside temperature conditions. Moreover, virtually all the refrigerant circuit of current air conditioning systems can be used as they are. Therefore, by adding the minimum cabin heating circuit and equipment, the highly reliable and high-efficiency heat-pump-type vehicle air conditioning system with the comparatively simple configuration, low cost, excellent mountability, and that can be ideally adopted for EV vehicles, HEV, and PHEV vehicles and the like can be provided.

According to the defrosting method of the heat-pump-type vehicle air conditioning device of the present invention, during defrosting operation, after the snow or frozen water that has been sprayed up and is adhering to the vehicle-cabin-exterior condenser has been defrosted by the first defrosting circuit using the hot gas refrigerant, the circuit is switched to the second defrosting circuit, and the frosting of the vehicle-cabin-exterior vaporizer is defrosted by the hot gas refrigerant. Therefore, hot gas refrigerant is fed in a concentrated manner separately to the vehicle-cabin-exterior condenser and the vehicle-cabin-exterior vaporizer, so they can be efficiently defrosted in a short period of time even under low outside air temperature conditions.

DESCRIPTION OF EMBODIMENTS

An embodiment of the present invention will be described below with reference to FIGS. 1 to 13.

Figure 1:
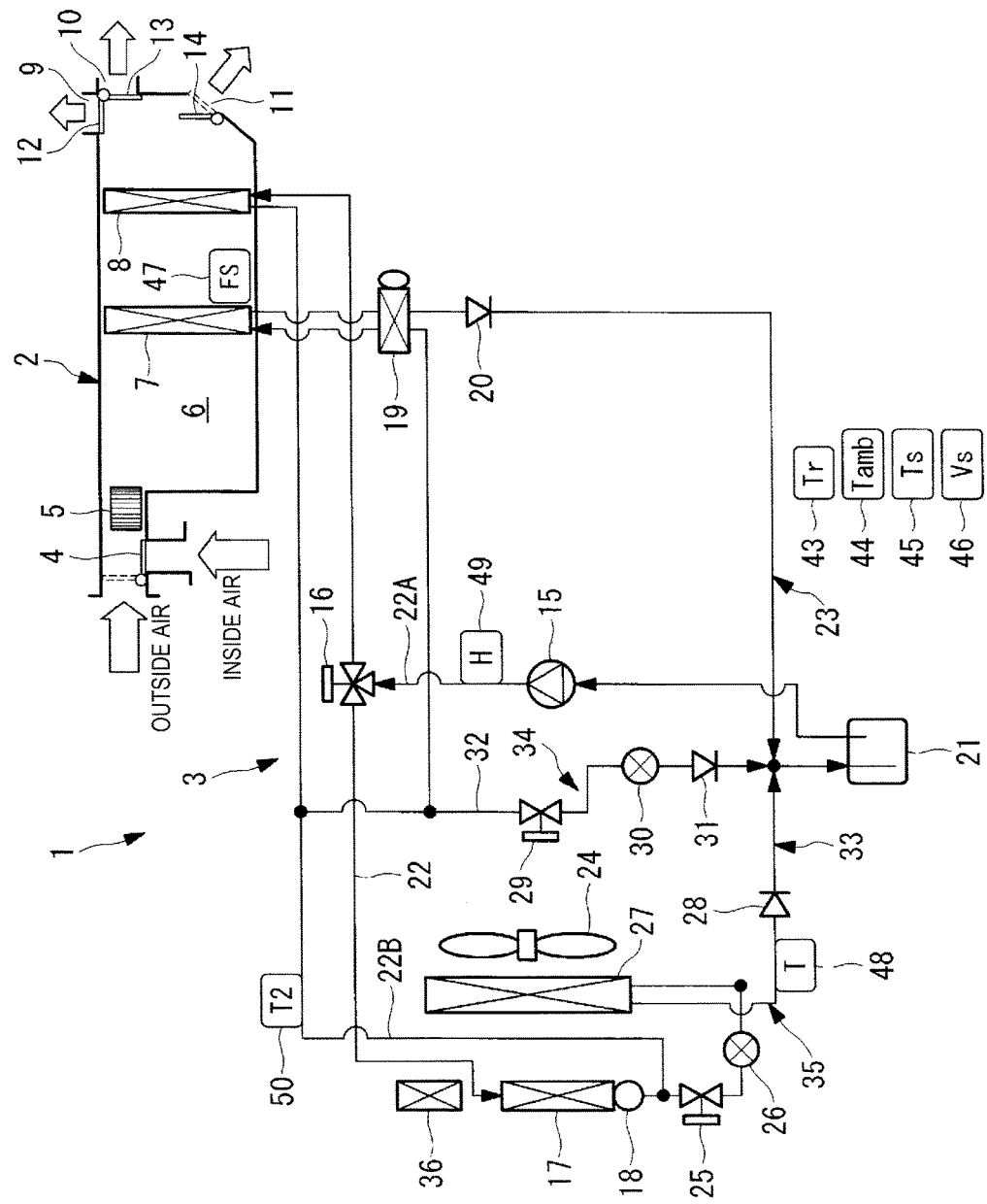
FIG. 1 is a refrigerant circuit diagram of a heat-pump-type vehicle air conditioning system according to an embodiment of the present invention.

FIG. 1 is a refrigerant circuit diagram of a heat-pump-type vehicle air conditioning system according to an embodiment of the present invention.

A heat-pump-type vehicle air conditioning system 1 according to the present embodiment includes a heating ventilation and air conditioning unit (HVAC unit) 2, and a heat pump cycle 3 capable of heating and cooling.

The HVAC unit 2 includes a blower 5 that can switch introduction of inside air from within the vehicle cabin or outside air using an inside and outside air switching damper 4 that switches between inside and outside air, and delivers the air under pressure to the downstream side, and a vehicle-cabin-interior vaporizer 7 and a vehicle-cabin-interior condenser 8 disposed in that order from the upstream side to the downstream side of an air flow channel 6 that is connected with the blower 5. The HVAC unit 2 is disposed within an instrument panel on the vehicle cabin side, and blows air whose temperature has been adjusted by the vehicle-cabin-interior vaporizer 7 and the vehicle-cabin-interior condenser 8 into the vehicle cabin from any of a plurality of defroster air vents 9, face air vents 10, or foot air vents 11 that open into the vehicle cabin, in accordance with a blow out mode that can be selectively switched by blow out mode switching dampers 12, 13, 14, so that the interior of the vehicle cabin is air conditioned to the setting temperature.

Figure 2:
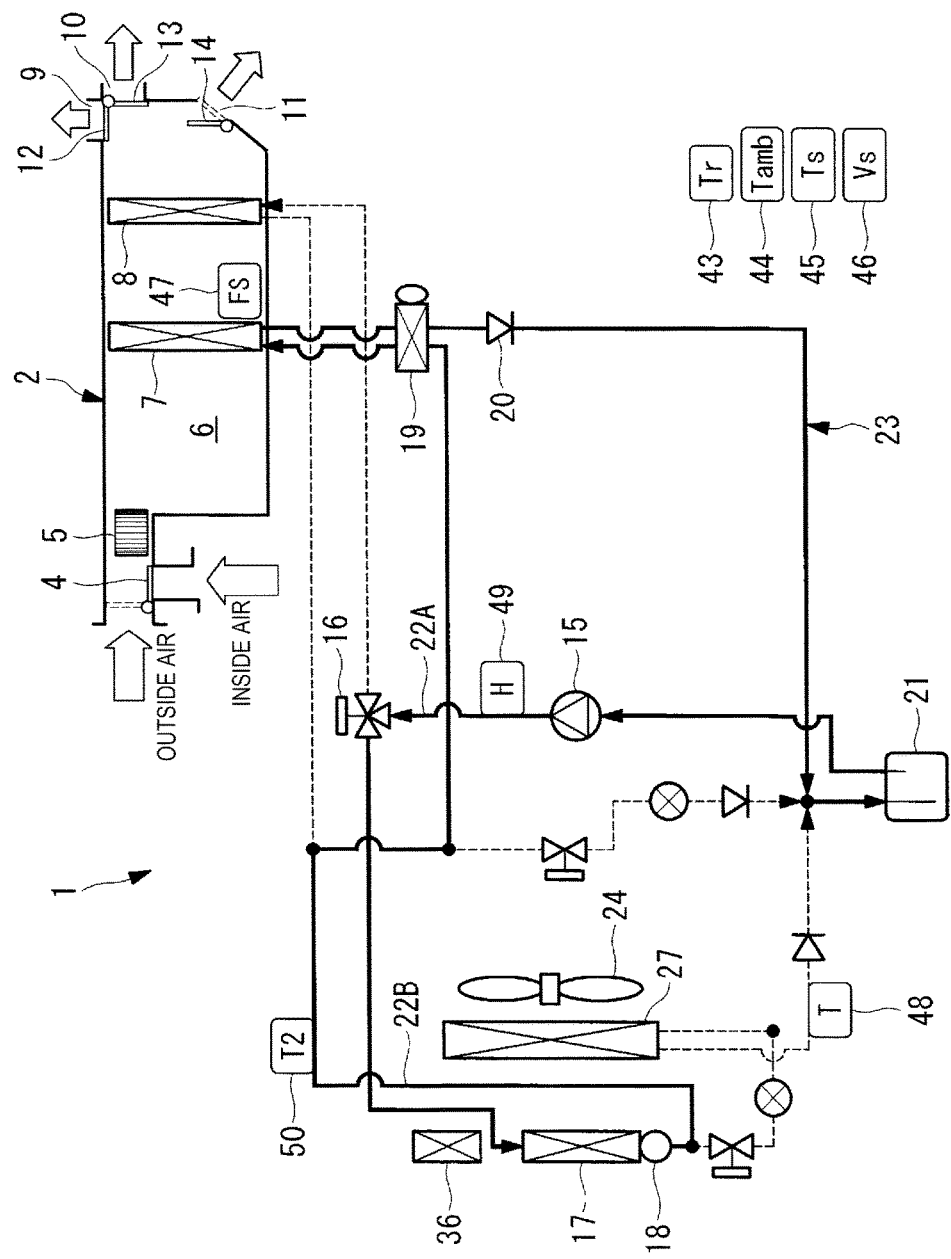
FIG. 2 is a refrigerant circuit diagram illustrating the refrigerant flow during cabin cooling of the above heat-pump-type vehicle air conditioning system.

The heat pump cycle 3 that is capable of cabin heating and cooling includes a closed cycle refrigeration cycle for cabin cooling (refrigerant circuit) 23 configured by connecting an electric compressor 15 that compresses refrigerant, refrigerant switching means (three-way switching valve) 16 that switches the flow direction of the refrigerant, a vehicle-cabin-exterior condenser 17, a receiver 18, a first decompression unit with on-off valve function (solenoid valve-equipped temperature-driven automatic expansion valve) 19, the vehicle-cabin-interior vaporizer 7, a check valve 20, and an accumulator 21 connected successively on a refrigerant pipe 22 (see FIG. 2). The refrigeration cycle for cabin cooling 23 is substantially equivalent to a current vehicle air conditioning device applied to an engine driven vehicle. A vehicle-cabin-exterior fan 24 that blows outside air is fitted to the vehicle-cabin-exterior condenser 17. The refrigerant switching means (three-way switching valve) 16 may be replaced by a configuration that combines two solenoid valves.

The vehicle-cabin-interior condenser 8 provided in the HVAC unit 2 is connected to a discharge pipe (discharge circuit) 22A from the electric compressor 15 of the refrigeration cycle for cabin cooling 23 of the heat pump cycle 3 for cabin heating and cooling via the refrigerant switching means (three-way switching valve) 16, and the refrigerant outlet of the vehicle-cabin-interior condenser 8 is connected to an exit side refrigerant pipe 22B of the vehicle-cabin-exterior condenser 17. A vehicle-cabin-exterior vaporizer 27 is connected to the exit side refrigerant pipe 22B of the vehicle-cabin-exterior condenser 17 via a second on-off valve (solenoid valve) 25 and a second decompression unit (expansion valve) 26 (hereinafter, the two are also collectively referred to as a second decompression unit 26 with on-off valve function), and the refrigerant outlet of the vehicle-cabin-exterior vaporizer 27 is connected to accumulator 21 via a check valve 28.

In the refrigeration cycle for cabin cooling 23, a bypass circuit 32 that includes a third on-off valve (solenoid valve) 29 and a third decompression unit (expansion valve) 30 (hereinafter, the two are also collectively referred to as a third decompression unit 30 with on-off valve function), and a check valve 31 is connected between the exit side refrigerant pipe 22B of the vehicle-cabin-exterior condenser 17 and the accumulator 21, configured so as to bypass the second decompression unit 26 with on-off valve function (the second on-off valve (solenoid valve) 25 and the second decompression unit (expansion valve) 26) and the vehicle-cabin-exterior vaporizer 27.

Figure 3:
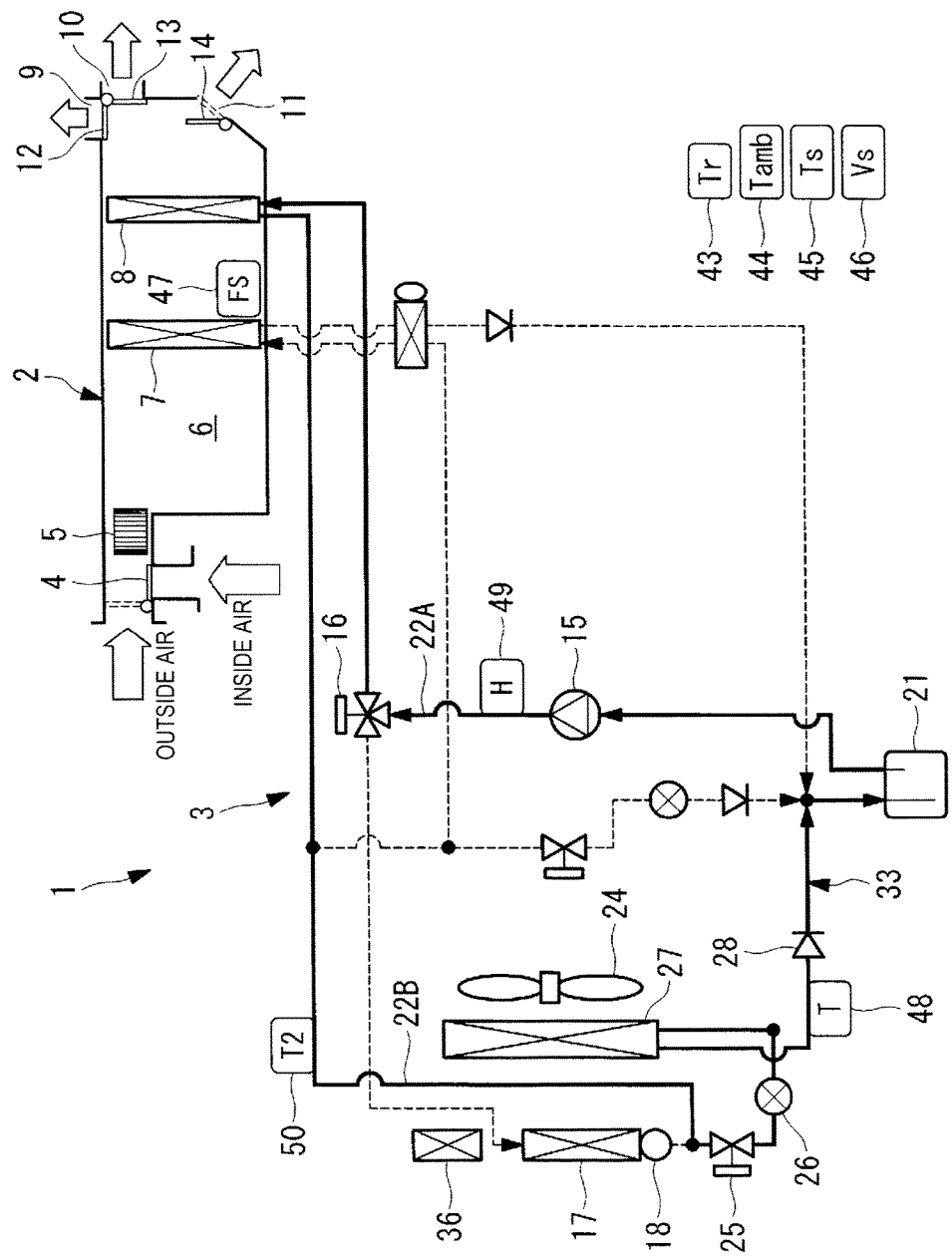
FIG. 3 is a refrigerant circuit diagram illustrating the refrigerant flow during cabin heating of the above heat-pump-type vehicle air conditioning system.

In this way, a closed cycle heat pump cycle for cabin heating (refrigerant circuit) 33 can be configured by connecting the electric compressor 15, the refrigerant switching means (three-way switching valve) 16, the vehicle-cabin-interior condenser 8, the liquid refrigerant pipe 22B, the second decompression unit 26 with on-off valve function (the second on-off valve 25 and the second decompression unit 26), the vehicle-cabin-exterior vaporizer 27, the check valve 28, and the accumulator 21 in this order via the refrigerant pipe 22 (see FIG. 3).

Figure 4:
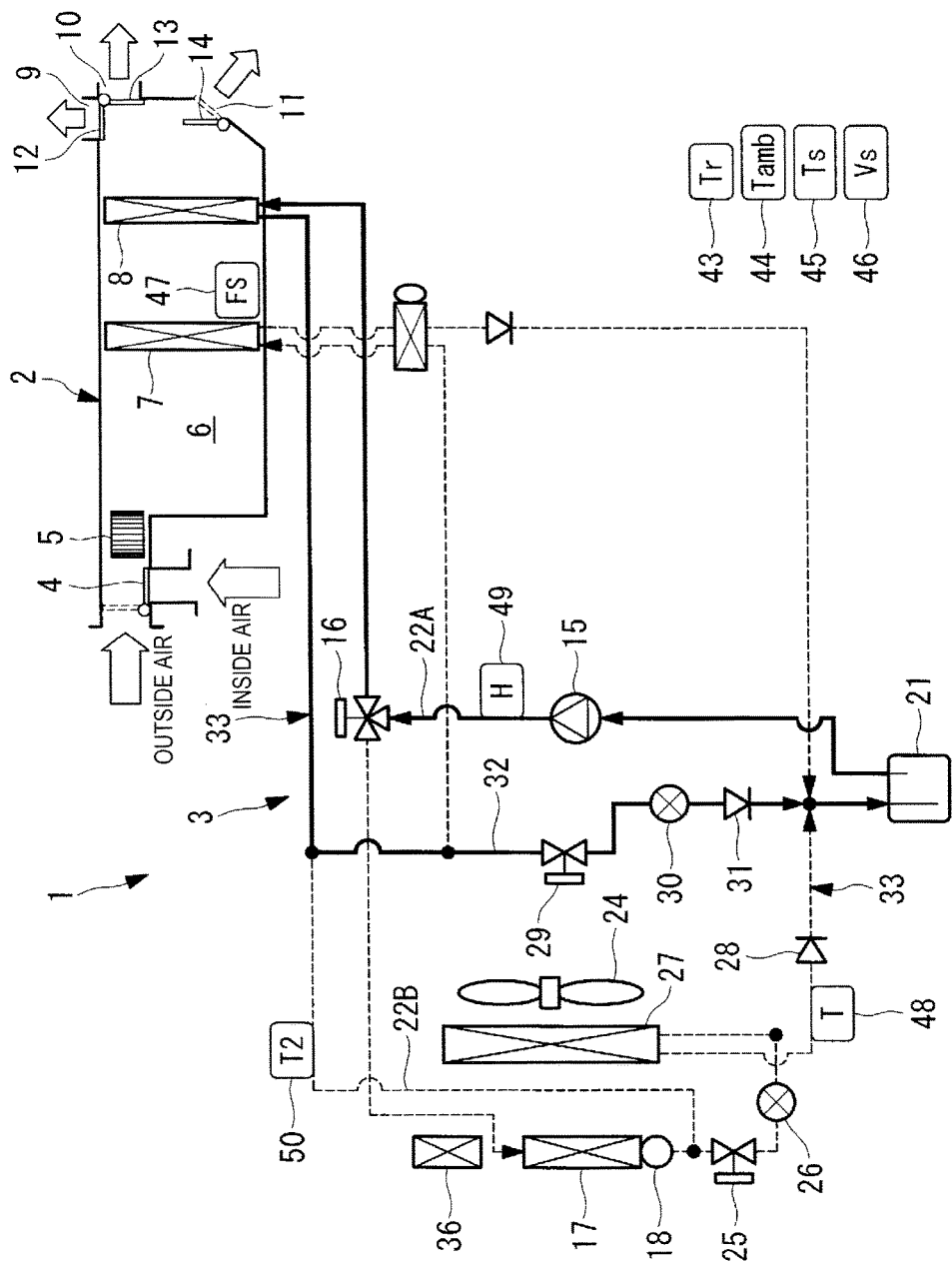
FIG. 4 is a refrigerant circuit diagram illustrating the refrigerant flow of the heat-pump-type vehicle air conditioning system after detection of frosting during cabin heating.

During cabin heating operation by the heat pump cycle for cabin heating 33, when frosting of the vehicle-cabin-exterior vaporizer 27 is detected, the second on-off valve 25 of the second decompression unit 26 with on-off valve function is closed, the third on-off valve 29 of the third decompression unit 30 with on-off valve function is opened, and the liquid refrigerant that has condensed in the vehicle-cabin-interior condenser 8 is introduced into the accumulator 21 via the bypass circuit 32, the third decompression unit 30 with on-off valve function, and the check valve 31, so it is possible to switch to cabin heating operation by a cycle 33A of hot gas absorbed into the electric compressor 15 (see FIG. 4).

Likewise, a first defrosting circuit 34 (see FIGS. 5A and 5B) that defrosts the vehicle-cabin-exterior condenser 17 can be configured by circulating hot gas output from the electric compressor 15 via the refrigerant switching means 16 through the vehicle-cabin-exterior condenser 17, the receiver 18, the liquid refrigerant pipe 22B, the bypass circuit 32, the third decompression unit 30 with on-off valve function (the third on-off valve 29 and the third decompression unit 30) and the check valve 31 on the bypass circuit 32, and the accumulator 21. Also, a second defrosting circuit 35 (see FIGS. 6A and 6B) that defrosts the vehicle-cabin-exterior vaporizer 27 can be configured by circulating the hot gas output from the electric compressor 15 via the refrigerant switching means 16 through the vehicle-cabin-exterior condenser 17, the receiver 18, the liquid refrigerant pipe 22B, the second decompression unit 26 with on-off valve function (second on-off valve 25 and second decompression unit 26), the vehicle-cabin-exterior vaporizer 27, the check valve 28, and the accumulator 21.

Figure 7:
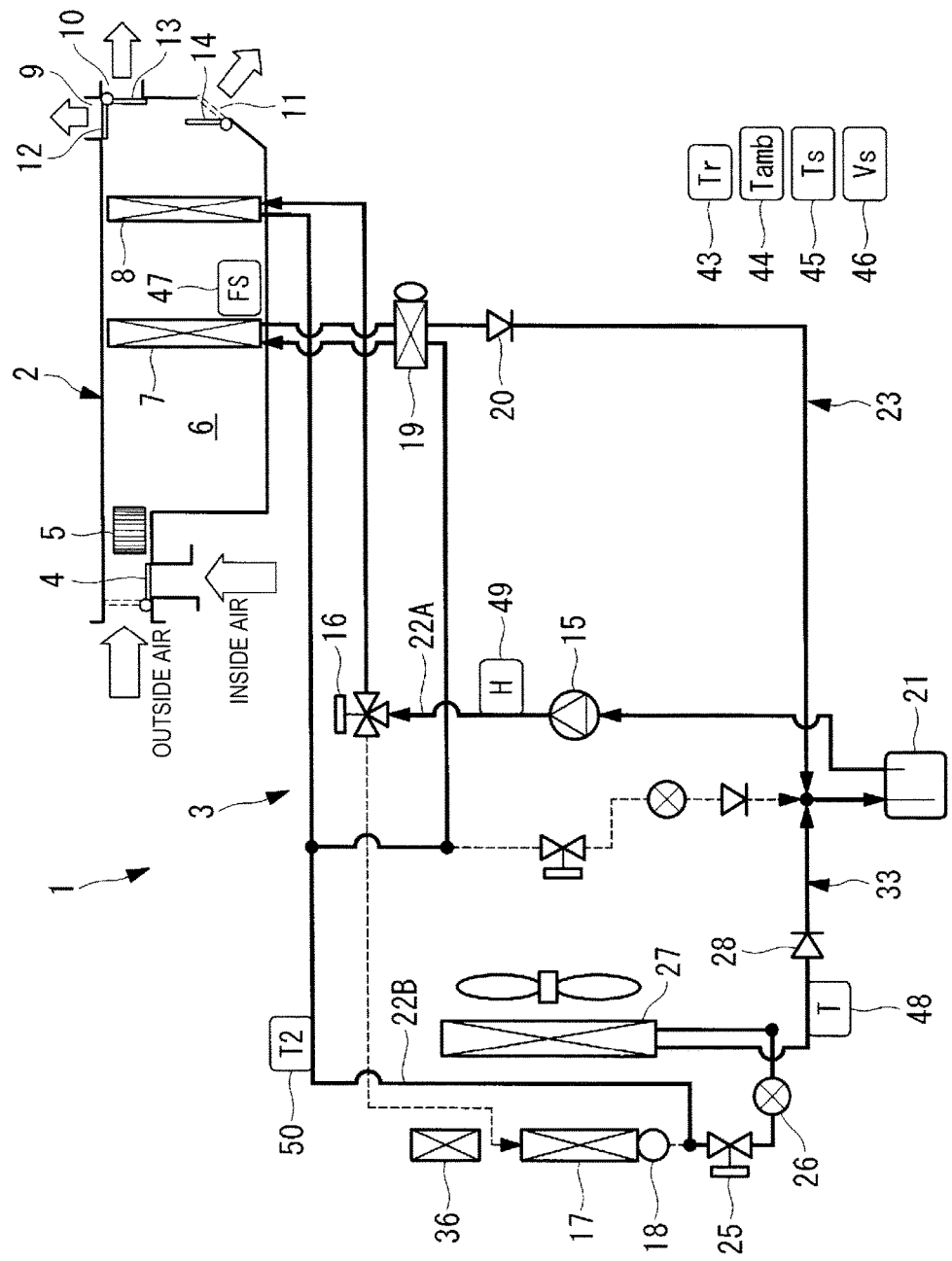
FIG. 7 is a refrigerant circuit diagram illustrating the refrigerant flow during dehumidification mode of the heat-pump-type vehicle air conditioning system.

The refrigerant circuit is a heat pump cycle (refrigerant circuit) for cabin heating 33, and also by opening the on-off valve function of the first decompression unit with on-off function (solenoid valve-equipped temperature-driven automatic expansion valve) 19 provided on the inlet side of the vehicle-cabin-interior vaporizer 7, and closing both the vehicle-cabin-exterior vaporizer 27 and the vehicle-cabin-interior vaporizer 7 or the second on-off valve 25 and passing the refrigerant to the vehicle-cabin-interior vaporizer 7, operation in dehumidification mode can be selected (see FIG. 7).

In the heat pump cycle 3 as described above, by installing the vehicle-cabin-exterior vaporizer 27 from which the heat pump cycle for cabin heating 33 is configured on the downstream side on the air flow path of the vehicle-cabin-exterior fan 24 that blows outside air to the vehicle-cabin-exterior condenser 17 from which the refrigeration cycle for cabin cooling 23 is configured, and parallel to the vehicle-cabin-exterior condenser 17, the vehicle-cabin-exterior fan 24 is shared. In addition, in the present embodiment, a radiator 36 that dissipates the heat of a heat medium (cooling water or the like) that cools heat generators such as the engine for driving the vehicle, a motor, an inverter, or the battery, is installed above the vehicle-cabin-exterior condenser 17, configured so that the vehicle-cabin-exterior vaporizer 27 can absorb the heat radiated therefrom. The radiator 36 may also be installed between the vehicle-cabin-exterior condenser 17 and the vehicle-cabin-exterior vaporizer 27.

Next, the refrigerant flow during operation of the heat-pump-type vehicular air-conditioning system as described above is described using FIGS. 2 to 7. In each drawing, the refrigerant flow during operation is indicated by thick lines.

[Cabin Cooling Operation]

During cabin cooling operation, the refrigerant compressed in the electric compressor 15 is circulated to the vehicle-cabin-exterior condenser 17 from the discharge pipe 22 via the refrigerant switching means 16, where it is condensed by heat exchange with the outside air blown by the vehicle-cabin-exterior fan 24, as illustrated in FIG. 2. This liquid refrigerant is stored within the receiver 18, then it is passed through the liquid refrigerant pipe 22B and the first decompression unit 19 with on-off valve function where it is decompressed, and supplied to the vehicle-cabin-interior vaporizer 7 within the HVAC unit 2.

The refrigerant supplied to the vehicle-cabin-interior vaporizer 7 is evaporated by heat exchange with the inside air or outside air blown from the blower 5, is passed through the check valve 20 and the accumulator 21, and is re-compressed by being re-absorbed into the electric compressor 15. Thereafter, the same cycle is repeated. The cabin cooling cycle of a current system used in an engine-driven vehicle can be used substantially as it is for this cabin cooling cycle 23. The inside air or the outside air that has been cooled by heat exchange with the refrigerant in the vehicle-cabin-interior vaporizer 7 is blown into the vehicle cabin from any of the defroster air vents 9, the face air vents 10, and the foot air vents 11 in accordance with the blow out mode switched by the blow out mode switching dampers 12 to 14, and is provided for cabin cooling within the vehicle cabin.

During cabin cooling operation, the second on-off valve (solenoid valve) 25 and the third on-off valve (solenoid valve) 29 of the second decompression unit 26 with on-off valve function and the third decompression unit 30 with on-off valve function respectively are both closed.

[Cabin Heating Operation]

During cabin heating operation, until frosting of the vehicle-cabin-exterior vaporizer 27 occurs, the refrigerant compressed by the electric compressor 15 is introduced into the vehicle-cabin-interior condenser 8 from the discharge pipe 22A via the refrigerant switching means 16, and here heat is dissipated by heat exchange with the inside air or the outside air blown by the blower 5, as illustrated in FIG. 3. The air that has been heated in this way is blown into the vehicle from any of the defroster air vents 9, the face air vents 10, and the foot air vents 11 in accordance with the blow out mode, and is provided for cabin heating within the vehicle cabin. Normal cabin heating operation is carried out in outside air introduction mode in order to prevent fogging of the windows.

The condensed and liquefied refrigerant that has lost heat in the vehicle-cabin-interior condenser 8 is passed through the liquid refrigerant pipe 22B and the second decompression unit 26 with on-off valve function (in this case, the second on-off valve (solenoid valve) 25 is opened) where it is decompressed, and supplied to the vehicle-cabin-exterior vaporizer 27. This two-phase gas-liquid refrigerant exchanges heat with the outside air blown by the vehicle-cabin-exterior fan 24 in the vehicle-cabin-exterior vaporizer 27, and after absorbing heat from the outside air is evaporated; then it is passed through the check valve 28 and the accumulator 21 and is absorbed into the electric compressor 15 and is compressed again. Thereafter, the same cycle is repeated. Thereby heat pump cabin heating is carried out by the heat pump cycle for cabin heating 33.

In this way, using the existing cabin cooling cycle 23, the heat pump cycle for cabin heating 33 can be configured by connecting the vehicle-cabin-interior condenser 8 for heating cabin to the discharge pipe (discharge circuit) 22A via the refrigerant switching means 16, and connecting the vehicle-cabin-exterior vaporizer 27 for heating cabin via the second decompression unit 26 with on-off valve function (the second on-off valve (solenoid valve) 25 and the second decompression unit (expansion valve) 26), using a portion of the circuits and equipment in common.

During this cabin heating operation, the solenoid valve of the first decompression unit 19 with on-off valve function and the second on-off valve (solenoid valve) 29 of the third decompression unit 30 with on-off valve function are both closed.

During cabin heating operation, when the outside air temperature is low, frosting occurs on the surface of the vehicle-cabin-exterior vaporizer 27, and if this progresses, the cabin heating capacity will be reduced. Therefore, when it is detected that there is frosting on the vehicle-cabin-exterior vaporizer 27, when cabin heating operation is continued, operation is switched to a hot gas cycle 33A in which the second on-off valve (solenoid valve) 25 of the second decompression unit with on-off valve function is closed, the third on-off valve 29 of the third decompression unit 30 with on-off valve function is opened, hot gas refrigerant from the electric compressor 15 is introduced into the vehicle-cabin-interior condenser 8 via the refrigerant switching means 16, and after heat is dissipated there and supplied for cabin heating, the liquid refrigerant is passed through the bypass circuit 32, the third decompression unit 30, and the check valve 31 and fed into the accumulator 21, and then absorbed into the electric compressor 15, as illustrated in FIG. 4, and cabin heating operation can be continued.

[Dehumidification Operation]

If the heat pump cycle for cabin heating 33 as described above is maintained as it is, dehumidification operation can be carried out by opening the solenoid valve of the first decompression unit with on-off valve function (solenoid valve-equipped temperature-driven automatic expansion valve) 19 and introducing a portion of the liquid refrigerant into the vehicle-cabin-interior vaporizer 7, and after the air that has been blown by the blower 5 is cooled and dehumidified by the vehicle-cabin-interior vaporizer 7, the air is heated by the vehicle-cabin-interior condenser 8 on the downstream side, and blown into the vehicle cabin, as illustrated in FIG. 7. In this case, the refrigerant that has been evaporated in both the vehicle-cabin-interior vaporizer 7 and the vehicle-cabin-exterior vaporizer 27 flows together in the accumulator 21, and is then absorbed into the electric compressor 15 where it is re-compressed. This dehumidification operation can also be carried out by closing the second on-off valve 25 of the second decompression unit with on-off valve function, and passing the refrigerant to the vehicle-cabin-interior vaporizer 7 only.

During the dehumidification operation as described above, the amount of cooling in the vehicle-cabin-interior vaporizer 7 may be controlled using the on-off valve function of the first decompression unit with on-off valve function (solenoid valve-equipped temperature-driven automatic expansion valve) 19 by controlling the opening and closing of the on-off valve (solenoid valve) as appropriate, and the temperature of the air heated by the vehicle-cabin-interior condenser 8 and blown into the vehicle cabin may be controlled, and in this way, the temperature linearity performance (property of tracking the setting temperature) can be ensured.

[Defrosting Operation]

As described above, when the vehicle-cabin-exterior vaporizer 27 is functioning during cabin heating operation, even when frosting of the vehicle-cabin-exterior vaporizer 27 is detected, cabin heating operation can be continued as it is by switching to the hot gas cycle using the vehicle-cabin-interior condenser 8, without immediately conducting a defrosting operation. Therefore, while the vehicle is being driven (used), the driver waits for defrosting to be carried out naturally by the outside air, without forcibly defrosting. However, when the state in which the outside air temperature is low continues, the frost remains attached to the vehicle-cabin-exterior vaporizer 27 without defrosting, so it is envisaged that the frost or freezing of sprayed up water or the like will remain attached to the vehicle-cabin-exterior vaporizer 27 during driving.

Therefore, when the vehicle is stopped (parked), and the driver is not present, and preferably when the vehicle battery has been charged and there is spare battery capacity after charging, the air conditioning system 1 is operated to carry out defrosting. During this defrosting operation, in order to successively defrost the vehicle-cabin-exterior condenser 17 and the vehicle-cabin-exterior vaporizer 27, defrosting operation 1 and defrosting operation 2 are carried out in two stages, configured to be carried out while the vehicle-cabin-exterior fan 24 is stopped, as illustrated in FIG. 4 and FIGS. 5A and 5B.

[Defrosting Operation 1]

Figure 5A:
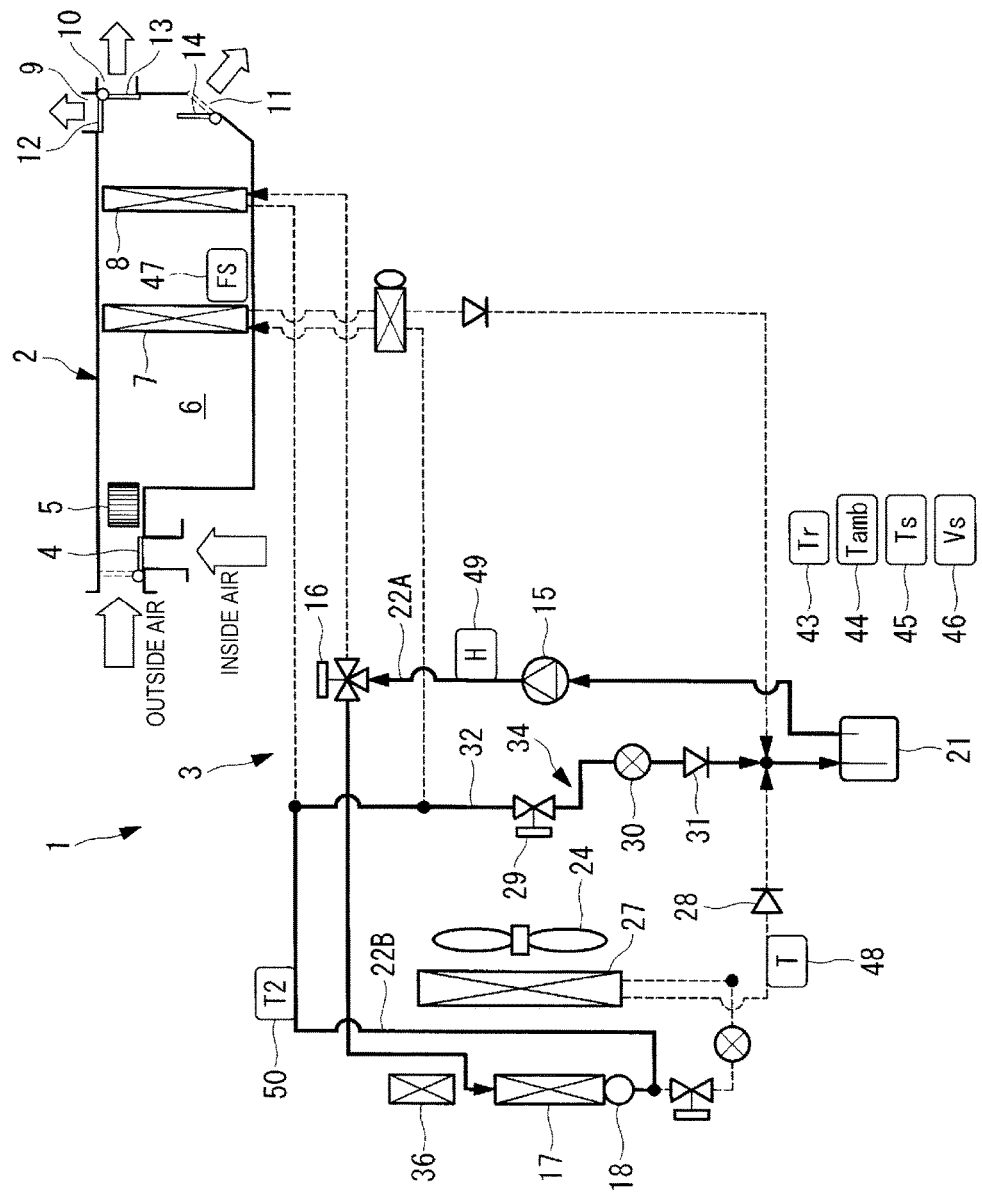
FIG. 5A is a refrigerant circuit diagram illustrating the refrigerant flow of the heat-pump-type vehicle air conditioning system during defrosting of the vehicle-cabin-exterior condenser.
Figure 5B:
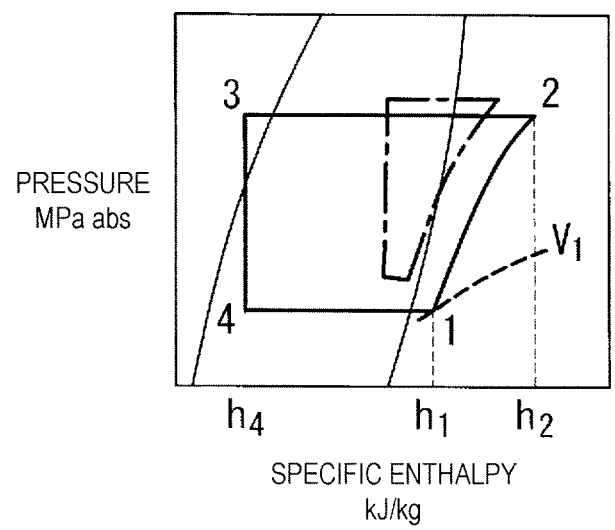
FIG. 5B is a Mollier diagram of the refrigerant flow of the heat-pump-type vehicle air conditioning system during defrosting of the vehicle-cabin-exterior condenser.

Defrosting operation 1 defrosts the vehicle-cabin-exterior condenser 17, and is carried out by a first defrosting circuit 34 as illustrated in FIGS. 5A and 5B. In this case, hot gas refrigerant from the electric compressor 15 is introduced to the vehicle-cabin-exterior condenser 17 by the refrigerant switching means 16, and here the heat is dissipated and the snow or ice or the like attached to the vehicle-cabin-exterior condenser 17 is melted, and the vehicle-cabin-exterior condenser 17 is defrosted. The condensed and liquefied refrigerant associated with the operation of defrosting the vehicle-cabin-exterior condenser 17 is circulated in the first defrosting circuit 34, in which it is passed through the receiver 18, the liquid refrigerant pipe 22B, the bypass circuit 32, the third decompression unit 30 with on-off valve function, and the check valve 31 and fed to the accumulator 21, and is absorbed into the electric compressor 15.

In this case, the solenoid valve of the first decompression unit 19 with on-off valve function and the second on-off valve (solenoid valve) 25 of the second decompression unit 26 with on-off valve function are closed.

In this way, hot gas refrigerant can be directly introduced into the vehicle-cabin-exterior condenser 17 for defrosting. FIG. 5B shows a comparison of the Mollier diagram of the first defrosting circuit 34 in this case and the Mollier diagram of a refrigeration cycle.

[Defrosting Operation 2]

Figure 6A:
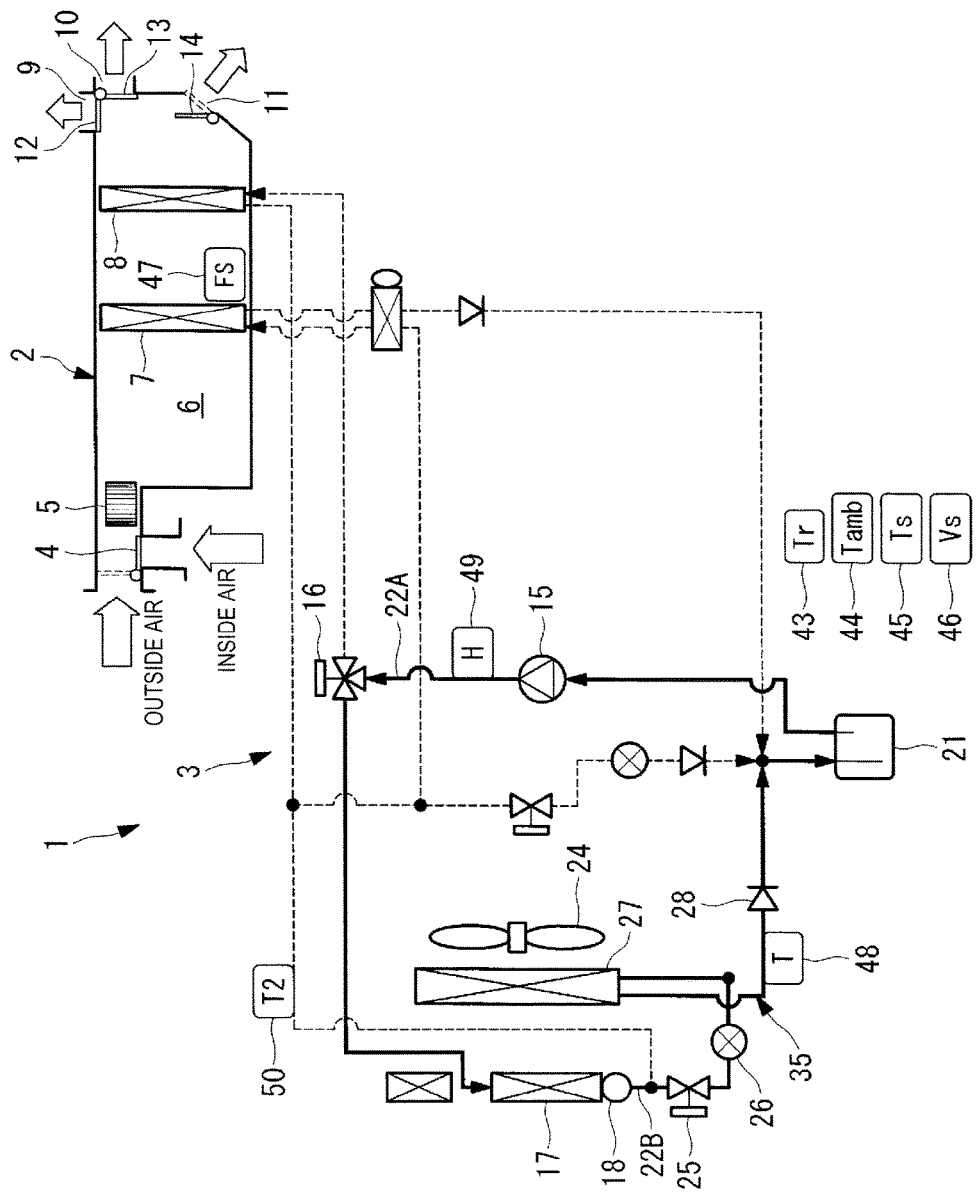
FIG. 6A is a refrigerant circuit diagram illustrating the refrigerant flow of the heat-pump-type vehicle air conditioning system during defrosting of the vehicle-cabin-exterior vaporizer.
Figure 6B:
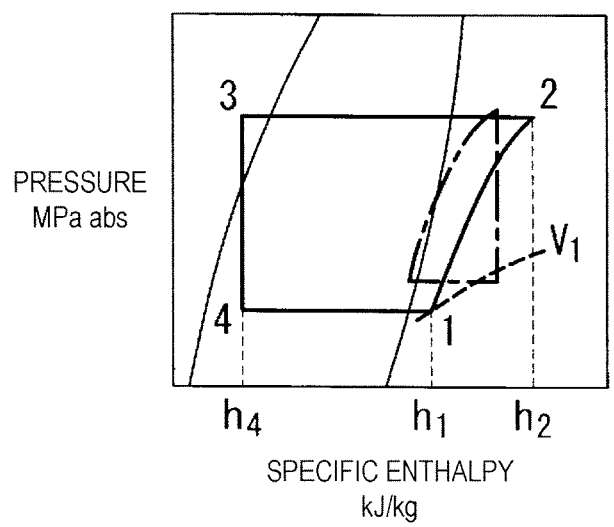
FIG. 6B is a Mollier diagram of the refrigerant flow of the heat-pump-type vehicle air conditioning system during defrosting of the vehicle-cabin-exterior vaporizer.

After completion of defrosting of the vehicle-cabin-exterior condenser 17, defrosting operation 2 for the vehicle-cabin-exterior vaporizer 27 is carried out by opening the second on-off valve 25 of the second decompression unit 26 with on-off valve function, and closing the third on-off valve 29 of the third decompression unit 30 with on-off valve function to form the second defrosting circuit 35, as illustrated in FIGS. 6A and 6B. In defrosting operation 2, hot gas refrigerant from the electric compressor 15 is passed through the vehicle-cabin-exterior condenser 17, the receiver 18, the liquid refrigerant pipe 22B, and the second decompression unit 26 with on-off valve function via the refrigerant switching means 16, and introduced into the vehicle-cabin-exterior vaporizer 27.

In this case, superheated gas expands adiabatically in the second decompression unit 26 and is introduced into the vehicle-cabin-exterior vaporizer 27, and heats the vehicle-cabin-exterior vaporizer 27, thereby melting the frost on the surface thereof. The refrigerant associated with defrosting the vehicle-cabin-exterior vaporizer 27 is circulated within the second defrosting circuit 35 by passing it through the check valve 28 and the accumulator 21, and inputting it to the electric compressor 15. In this case, this is carried out with the solenoid valve of the first decompression unit 19 with on-off valve function closed. In this way, hot gas refrigerant can be directly introduced into the vehicle-cabinexterior vaporizer 27 for defrosting. FIG. 6B shows a comparison of the Mollier diagram of the second defrosting circuit 35 in this case and the Mollier diagram of a refrigeration cycle.

The defrosting operation of the vehicle-cabin-exterior vaporizer 27 using the second defrosting circuit 35 is configured to be completed when it is confirmed by frosting detection means (that determines whether or not the temperature difference of a vehicle-cabin-exterior vaporizer refrigerant temperature sensor (T1) 48 and an outside air temperature sensor (Tamb) 45, which are described later, is equal to or greater than a predetermined value a) that there is no frost. In other words, by confirming that defrosting is completed from the fact that the frosting detection means is not activated, the vehicle-cabin-exterior vaporizer 27 can be properly defrosted without residual frost.

Figure 8:
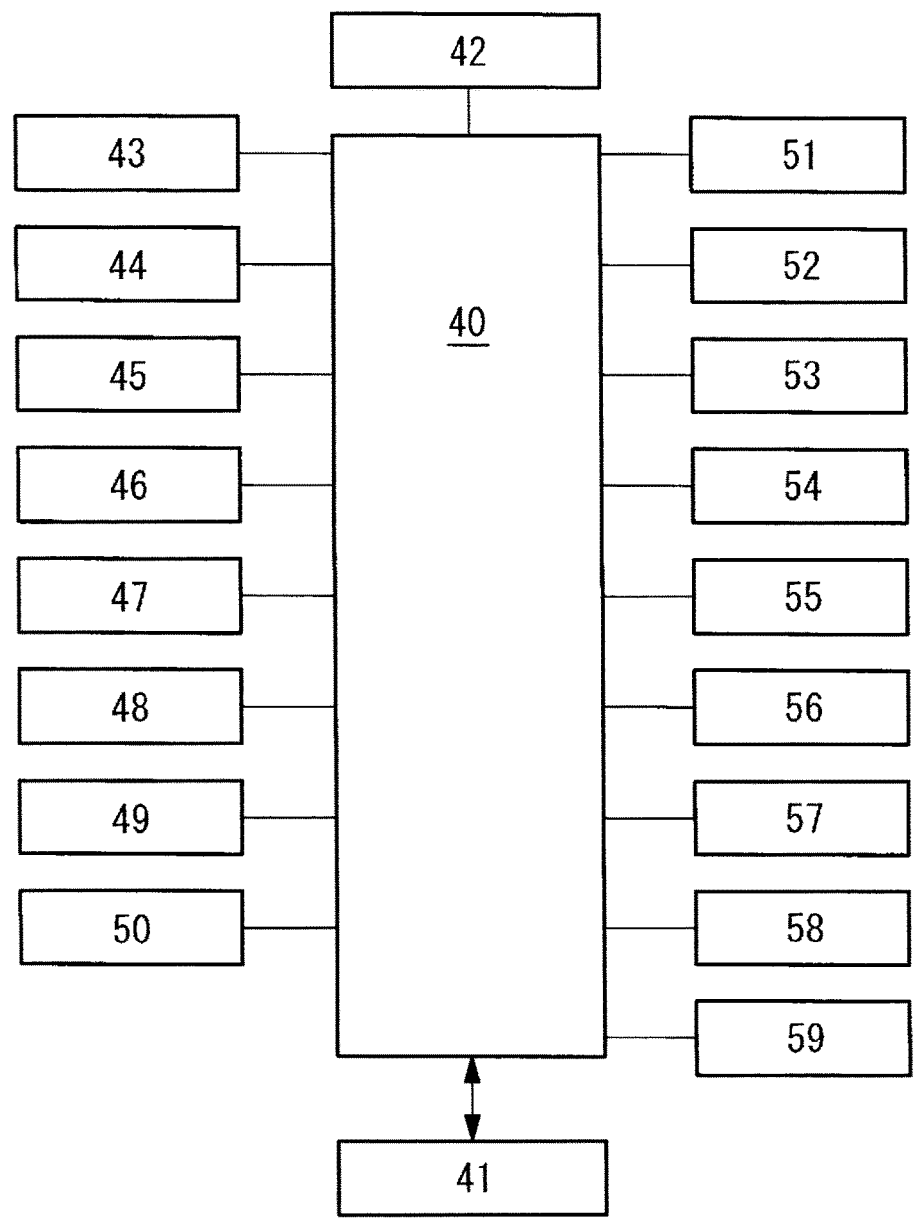
FIG. 8 is a block diagram of a control device that controls the heat-pump-type vehicle air conditioning system.

The above operations are controlled by a control device 40 as illustrated in FIG. 8. The control device 40 is connected to a host controller 41 on the vehicle side, and is configured so that information from the vehicle side is input, and also includes a control panel 42. Operation of the air conditioning system 1 is controlled based on detection signals from the following group of sensors and information input from the host controller 41 and the control panel 42.

Detection signals are input to the control device 40 from a vehicle interior temperature sensor (Tr) 43 installed within the vehicle cabin, an outside air temperature sensor (Tamb) 44, a solar radiation sensor (Ts) 45, a vehicle speed sensor 46, as well as a blow out air temperature sensor (FS) 47 installed on the vehicle-cabin-interior vaporizer 7, a vehicle-cabin-exterior vaporizer temperature sensor (T1) 48 installed on the vehicle-cabin-exterior vaporizer 27, a high pressure sensor (HP) 49 installed on the discharge pipe 22A, and a vehicle-cabin-exterior condenser refrigerant temperature sensor (T2) 50 installed on the exit side refrigerant pipe 22B of the vehicle-cabin-exterior condenser 17 on the air conditioning system 1 side, and the like.

The control device 40 undertakes the function of controlling the operation of the air conditioning system as described above by carrying out the required calculations and processes and the like in accordance with a program that is set in advance, based on the detection signals from the above group of sensors and the information input from the control panel 42 and the host controller 41 on the vehicle side, and controlling an actuator for the blow out mode switching dampers 12 to 14, an actuator for the inside and outside air switching damper 4, a motor 53 for the blower 5, a motor 54 for the vehicle-cabin-exterior fan 24, a motor for the electric compressor 15, an electromagnetic coil 56 for the refrigerant switching means (three-way switching valve) 16, electromagnetic coils 57, 58, 59 for the solenoid valve of the first decompression unit with on-off valve function (solenoid valve-equipped temperature-driven automatic expansion valve) 19 and the second on-off valve (solenoid valve) 25 and the third on-off valve (solenoid valve) 29.

The following is a description of the control of the operation of the air conditioning system 1 by the control device 40 with reference to the flowcharts illustrated in FIGS. 9 to 13.

Figure 9:
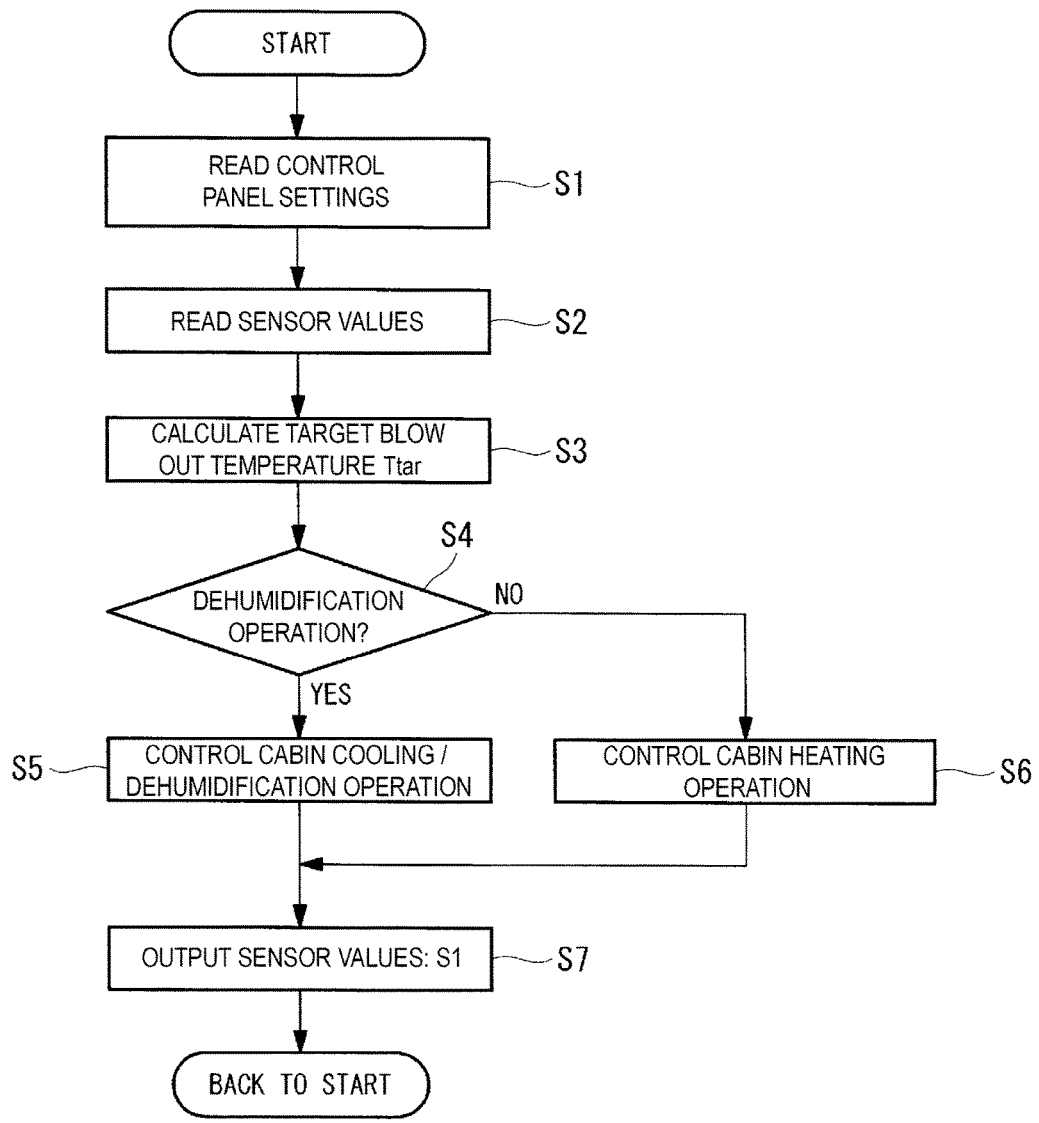
FIG. 9 is an operation control flowchart of the control device.

FIG. 9 is a main control flowchart for the air conditioning system 1. After the control is started, first, in step S1, the control panel 42 settings are read, and in step S2, the detection values of each of the sensors 43 to 50 are read. Based on these setting values and detection values, in step S3, the target blow out temperature Ttar is calculated, and the procedure moves to step S4. Here, it is determined whether or not to carry out dehumidification operation, and if YES, the procedure moves to step S5 and enters "cabin cooling/dehumidification operation control", and if NO, the procedure moves to step S6 and enters "cabin heating operation control". Thereafter, in step S7, the detection values of each of the sensors are output, and the procedure returns to the start.

Figure 10:
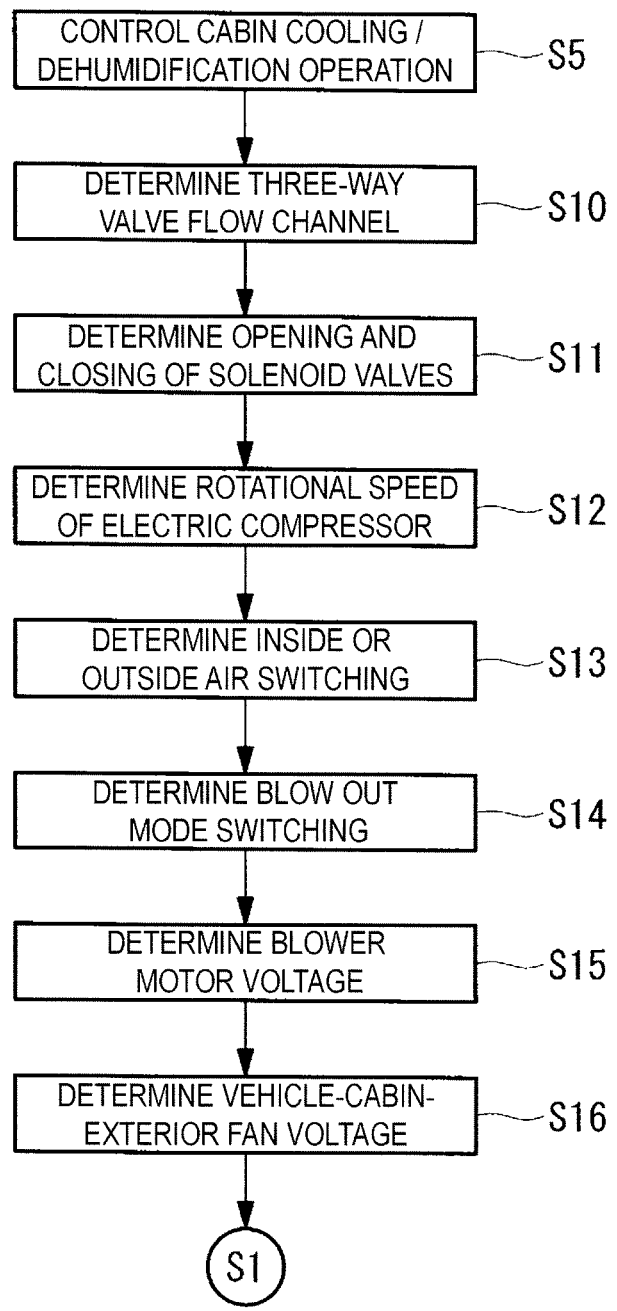
FIG. 10 is a control flowchart of the control device during cabin cooling and dehumidification operation.

In step S5, the procedure enters "cabin cooling/dehumidification operation control", and if cabin cooling is selected, the cabin cooling operation control illustrated in FIG. 10 is executed. In the cabin cooling operation control, first, in step S10, the flow channel of the refrigerant switching means (three-way switching valve) 16 is determined, and the circuit is switched to circulate the refrigerant output from the electric compressor 15 to the vehicle-cabin-exterior condenser 17 side. Next, in step S11, opening and closing of the on-off valves (solenoid valves) is determined, and the solenoid valve of the first decompression unit 19 with on-off valve function is opened, and the second on-off valve 25 of the second decompression unit 26 with on-off valve function and the third on-off valve 29 of the third decompression unit 30 with on-off valve function are closed. In this way, the cabin cooling cycle 23 illustrated in FIG. 2 is set.

In addition, the cabin cooling operation is executed so that the temperature within the vehicle is the setting temperature, by determining successively the rotational speed of the electric motor 15 in step S12, the blow in mode by switching the inside and outside air switching damper 4 in step S13, the blow out mode by switching the blow out mode switching dampers 12 to 14 in step S14, the drive voltage of the blower 5 in step S15, and the drive voltage of the vehicle-cabin-exterior fan 24 in step S16, and the like, and by driving the motors and actuators 51 to 55. Then, the procedure moves to Si (step S7), and the cabin cooling operation continues.

If defrosting operation control is selected in step S5, in step S10, the flow channel of the refrigerant switching means (three-way switching valve) 16 is determined, and switched to the circuit that circulates the refrigerant output from the electric compressor 15 toward the vehicle-cabin-interior condenser 8. Then, in step S11, opening and closing of the on-off valves (solenoid valves) is determined, and the solenoid valve of the first decompression unit 19 with on-off valve function and the second on-off valve 25 of the second decompression unit 26 with on-off valve function are opened, and the third on-off valve 29 of the third decompression unit 30 with on-off valve function is closed. In this way, air that has been cooled and dehumidified in the vehicle-cabin-interior vaporizer 7 is heated in the vehicle-cabin-interior condenser 8 to enable temperature adjusted dehumidification operation, as illustrated in FIG. 7.

Next, dehumidification operation is executed so that the temperature within the vehicle is the setting temperature, by successively determining the rotational speed of the electric compressor 15 in step S12, the blow in mode by switching the inside and outside air switching damper 4 in step S13, the blow out mode by switching the blow out mode switching dampers 12 to 14 in step S14, the drive voltage of the blower 5 in step S15, and the drive voltage of the vehicle-cabin-exterior fan 24 in step S16, and driving the motors and the actuators 51 to 55. Then, the procedure moves to S1 (step S7), and the defrosting operation continues.

In this dehumidification operation, the solenoid valve of the first decompression unit 19 with on-off valve function may be opened, and the second on-off valve 25 of the second decompression unit 26 with on-off valve function and third on-off valve 29 of the third decompression unit 30 with on-off valve function may be closed, so that the refrigerant flows to the vehicle-cabin-interior vaporizer 7 only, or the opening and closing of the solenoid valve of the first decompression unit 19 with on-off valve function may be controlled as appropriate, so that the dehumidification operation is carried out while controlling the amount of cooling in the vehicle-cabin-interior vaporizer 7.

Figure 11:
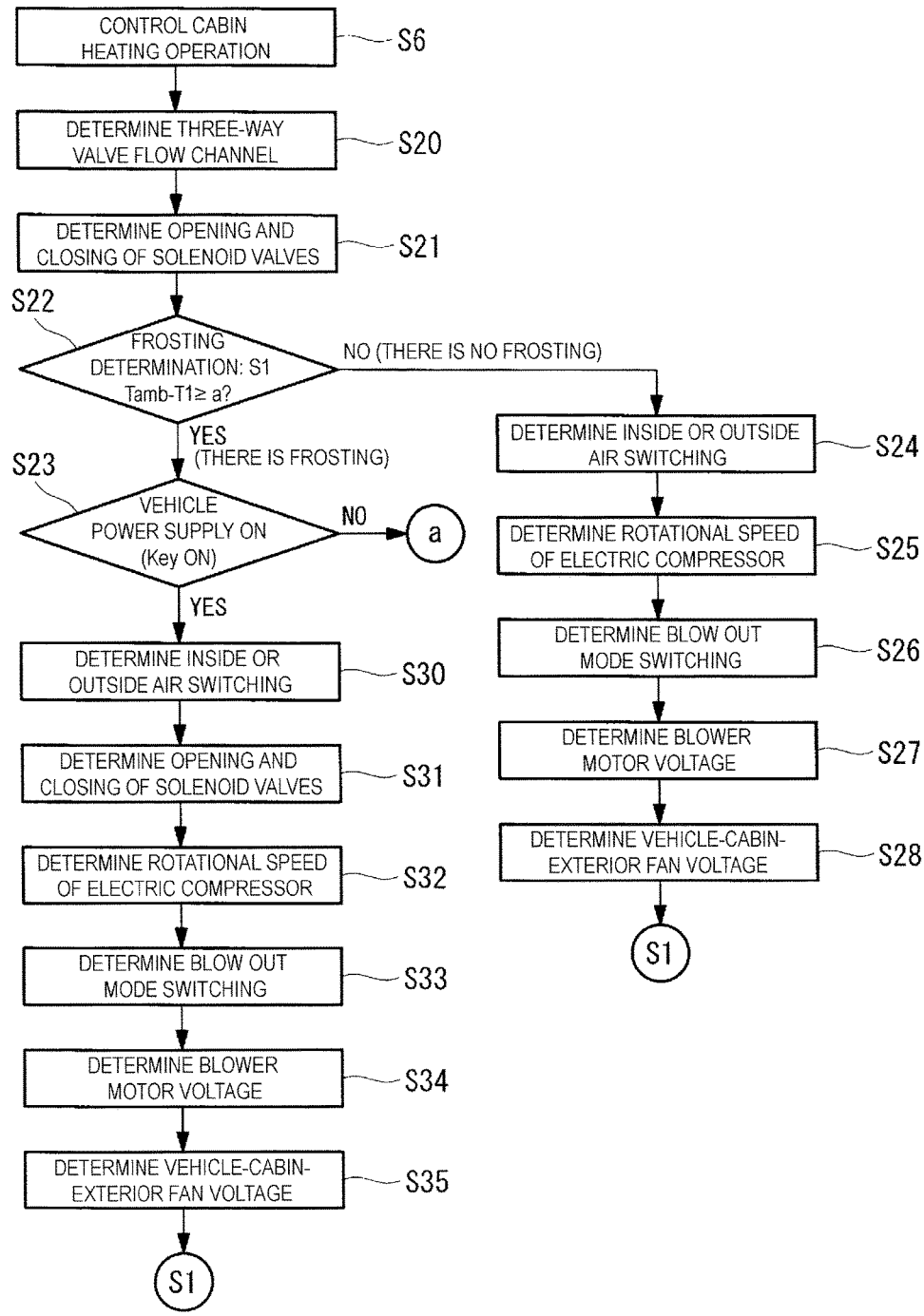
FIG. 11 is a portion of a control flowchart of the control device during cabin heating operation.
Figure 12:
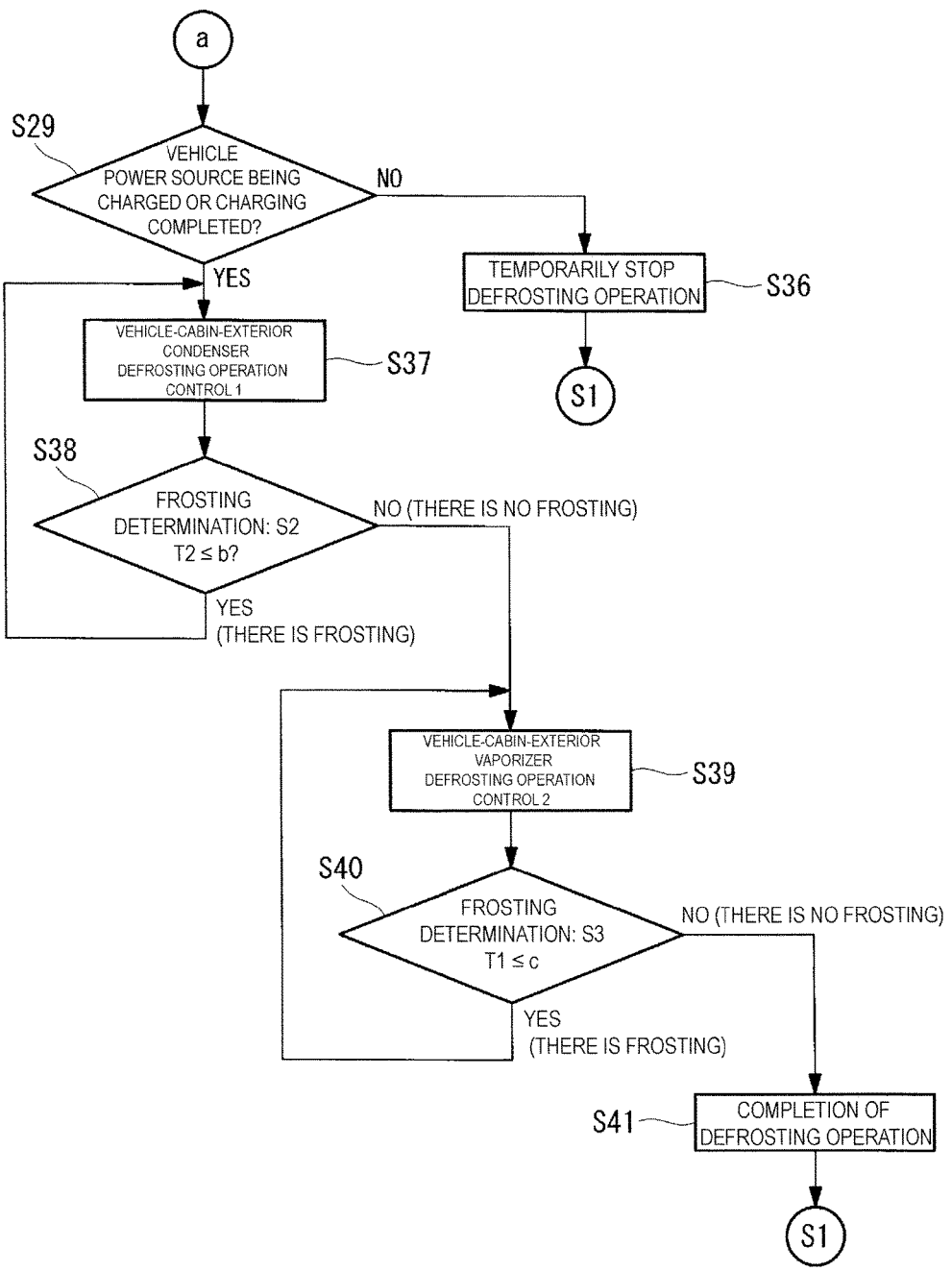
FIG. 12 is the remaining portion of the control flowchart illustrated in FIG. 11 during cabin heating operation.

On the other hand, if in step S6, "cabin heating operation control" is entered, the procedure moves to the cabin heating operation control illustrated in FIGS. 11 and 12. In the cabin heating operation control, in step S20, the flow channel of the refrigerant switching means (three-way switching valve) 16 is determined, and switched to the circuit in which the refrigerant flows to the vehicle-cabin-interior condenser 8 side. Next, in step S21, opening and closing of the solenoid valves is determined, and the solenoid valve of the first decompression unit on-off valve function (solenoid valve-equipped temperature-driven automatic expansion valve) 19 and the third on-off valve 29 of the third decompression unit 30 with on-off valve function are closed, and the second on-off valve 25 of the second decompression unit 26 with on-off valve function is opened. In this way, the heat pump cycle for cabin heating 33 illustrated in FIG. 3 is set.

Then, the procedure moves to step S22, and here it is determined whether or not there is frosting on the vehicle-cabin-exterior vaporizer 27. This frosting determination S1 determines whether or not the difference between the detection value T1 of the vehicle-cabin-exterior vaporizer refrigerant temperature sensor 48 and the detection value Tamb of the outside air temperature sensor 44 is equal to or greater than the setting value a (T1−Tamb≥a), if YES (there is frosting), the procedure moves to step S23, and if NO (there is no frosting), the procedure moves to step S24. If there is no frosting, the vehicle-cabin-exterior vaporizer 27 functions as an evaporator, and the cabin heating operation is executed by the heat pump cycle for cabin heating 33.

When executing the cabin heating operation, the cabin heating operation is executed so that the temperature within the vehicle is the setting temperature, by determining the outside air introduction mode by the inside and outside air switching damper 4 in step S24, and successively determining the rotational speed of the electric compressor 15 in step S25, the blow out mode by switching the blow out mode switching dampers 12 to 14 in step S26, the drive voltage of the blower 5 in step S27, and the drive voltage of the vehicle-cabin-exterior fan 24 in step S28, and by driving the motors and actuators 51 to 55. Then, the procedure moves to S1 (=step S7), and the cabin heating operation continues.

If it is determined that there is frosting in step S22, when the procedure moves to step S23, and when it is determined whether or not the vehicle power source is ON (Key ON), if NO, the procedure moves to step S29 (see FIG. 12), and if YES, the procedure moves to step S30. In step S30, the inside and outside air switching damper 4 is placed in the outside air introduction mode or the inside air mixing mode, and the procedure then moves to step S31 and it is determined whether or not the solenoid valves are opened or closed.

In this case, in step S31, the solenoid valve of the first decompression unit with on-off valve function (solenoid valve-equipped temperature-driven automatic expansion valve) 19 and the second on-off valve 25 of the second decompression unit 26 with on-off valve function are closed, and the third on-off valve 29 of the third decompression unit 30 with on-off valve function is opened. Therefore, the cycle is switched to the hot gas cycle 33A in which after the refrigerant associated with the cabin heating by heat dissipation in the vehicle-cabin-interior condenser 8 is condensed in the vehicle-cabin-interior condenser 8, it is passed through the bypass circuit 32, the third decompression unit 30, and the check valve 31, is introduced into the accumulator 21, and absorbed into the electric compressor 15. In this way, when frosting is detected on the vehicle-cabin-exterior vaporizer 27, the cabin heating operation continues by the hot gas cycle 33A illustrated in FIG. 4.

When the opening and closing of the solenoid valves is determined in step S31, and cabin heating operation by the gas cycle 33A is switched, the cabin heating operation is executed so that the temperature within the vehicle is the setting temperature, by successively determining the rotational speed of the electric compressor 15 in step S32, the blow out mode by switching the blow out mode switching dampers 12 to 14 in step S33, the drive voltage of the blower 5 in step S34, and the drive voltage of the vehicle-cabin-exterior fan 24 in step S35, and driving the motors and the actuators 51 to 55. Then, the procedure moves to S1 (=step S7), and cabin heating operation continues regardless of whether there is frosting on the vehicle-cabin-exterior vaporizer 27.

In step S23, if the response is NO, in other words, if it is determined that the vehicle power source is OFF, and the procedure has moved to step S29 (see FIG. 12), it is determined whether or not the vehicle power source (battery) is being charged or charging has been completed. Here, if it is determined NO, it is determined that the amount of charging of the battery is not sufficient or that it is not being charged, or that the driver is still in the vehicle, so the procedure moves to step S36 and the defrosting operation is temporarily stopped. Then, the procedure moves to S1 (=step S7), and the same operation is repeated.

On the other hand, if in step S29 it is determined YES, then it is determined that the vehicle is stopped (parked) and the driver is not present, and the vehicle power source (battery) is either being charged or charging is completed, so the procedure moves to step S37 and "defrosting operation control 1" to defrost the vehicle-cabin-exterior condenser 17 is executed. There is a possibility that frosting of the vehicle-cabin-exterior condenser 17 and the vehicle-cabin-exterior vaporizer 27 can be naturally defrosted during driving after frosting has occurred, but when it is determined that there is frosting and when the vehicle power source is OFF, the "defrosting operation controls 1, 2" are always executed.

Figure 13:
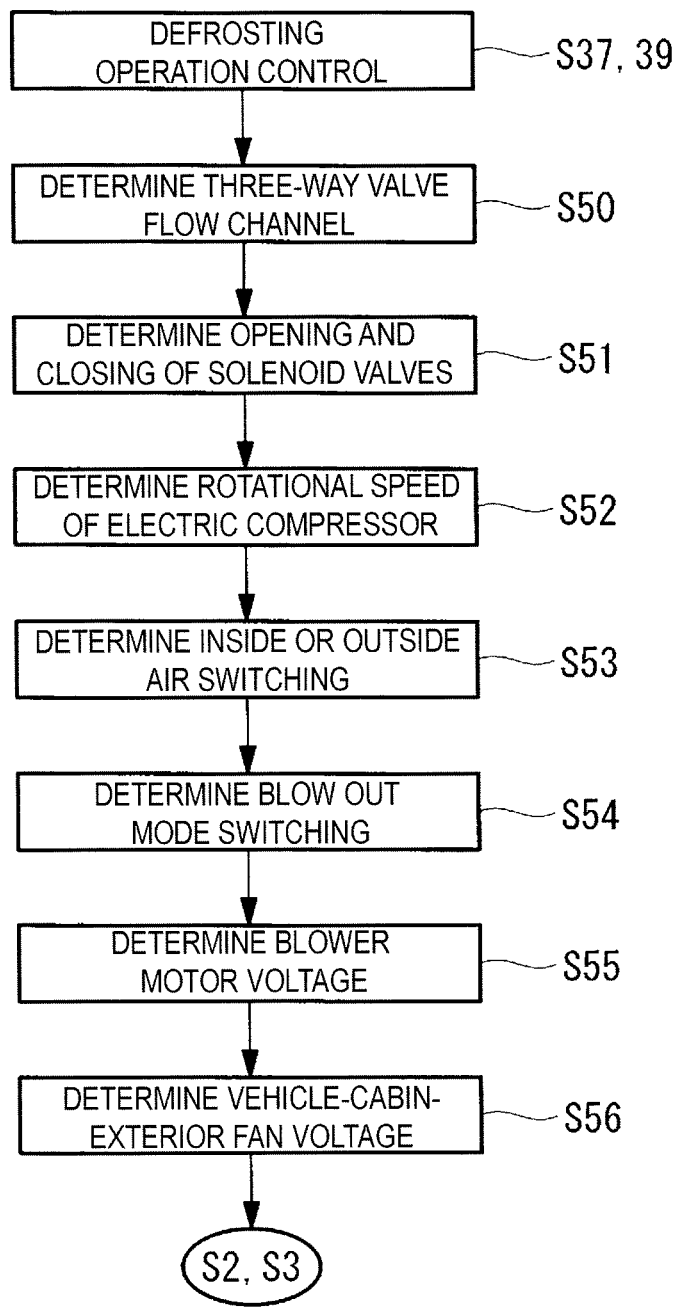
FIG. 13 is a control flowchart of the control device during defrosting operation.

As illustrated in FIG. 13, in defrosting operation control 1, in step S50, the flow channel of the refrigerant switching means (three-way switching valve) 16 is determined, and the hot gas refrigerant from the electric compressor 15 is switched to the circuit that flows toward the vehicle-cabin-exterior condenser 17. Next, in step S51, opening and closing of the solenoid valves is determined, and the third on-off valve 29 of the third decompression unit 30 with on-off valve function is opened, and the solenoid valve of the first decompression unit 19 with on-off valve function and the second on-off valve 25 of the second decompression unit 26 with on-off valve function are closed. In this way, the first defrosting circuit 34 is set as illustrated in FIGS. 5A and 5B.

Thereafter, the procedure moves to step S52, and the rotational speed of the electric compressor 15 in step S52, the blow in mode (inside air circulation mode) by switching the inside and outside air switching damper 4 in step S53, the blow out mode by switching the blow out mode switching dampers 12 to 14 in step S54, the drive voltage of the blower 5 in step S55, and the drive voltage of the vehicle-cabin-exterior fan 24 in step S56 are successively determined, and the motors and actuators 51 to 55 are driven. In this way, the refrigerant is circulated in the first defrosting circuit 34, hot gas is introduced into the vehicle-cabin-exterior condenser 17, and defrosting operation of the vehicle-cabin-exterior condenser 17 is executed. During the defrosting operation, the vehicle-cabin-exterior fan 24 is stopped.

While the vehicle-cabin-exterior condenser 17 is being defrosted by the "defrosting operation control 1", determination of frosting S2 in step S38 is executed. This defrosting determination S2 determines whether or not defrosting is completed by whether or not the detection value T2 of the vehicle-cabin-exterior condenser refrigerant temperature sensor (T2) 50 is greater than a set value b (T2≤b). In other words, when the detection value T2 is equal to or less than the set value b, it is determined that frosting still remains that has not been melted (YES), so the defrosting operation is continued, and when the detection value T2 exceeds the set value b, it is determined that the frost has melted and defrosting is completed, and the procedure moves to the next step S39.

In step S39, "defrosting operation control 2" is executed to defrost the vehicle-cabin-exterior vaporizer 27. In "defrosting operation control 2", as illustrated in FIG. 13, determination of the flow channel of the refrigerant switching means (three-way switching valve) 16, determination of the opening and closing of the solenoid valves (in this case, the second on-off valve 25 of the second decompression unit 26 with on-off valve function is opened, and the solenoid valve of the first decompression unit 19 with on-off valve function and the third on-off valve 29 of the third decompression unit 30 with on-off valve function are closed), the rotational speed of the electric compressor 15, the blow in mode (inside air circulation mode) by switching the inside and outside air switching damper 4, the blow out mode by switching the blow out mode switching dampers 12 to 14, the drive voltage of the blower 5, and the drive voltage of the vehicle-cabin-exterior fan 24 are successively determined, and the motors and actuators 51 to 55 are driven.

In this way, refrigerant is circulated to the second defrosting circuit 35, as illustrated in FIGS. 6A and 6B, and by introducing hot gas refrigerant to the vehicle-cabin-exterior vaporizer 27, defrosting operation of the vehicle-cabin-exterior vaporizer 27 is executed. While the vehicle-cabin-exterior vaporizer 27 is being defrosted by the "defrosting operation control 2", the frosting determination in step S40 is carried out. In this frosting determination S3, it is determined whether or not defrosting is completed by whether or not the detection value T1 of the vehicle-cabin-exterior vaporizer refrigerant temperature sensor (T1) 48 exceeds a set value c (T1≤c). In other words, when the detection value T1 is equal to or less than the set value c, it is determined that frost that has not been melted still remains (YES), so the defrosting operation is continued, and when the detection value T1 exceeds the set value c, it is determined that the frost has been melted and defrosting is completed, so the procedure moves to the next step S41, and the defrosting operation is completed. During this defrosting operation also, the vehicle-cabin-exterior fan 24 is stopped.

The "defrosting operation control 1" and "defrosting operation control 2" are configured so that, as illustrated in FIG. 13, every time the "defrosting operation control" of step S50 to step S56 is completed, in S2 and S3 (=step S38 and step S40), the frosting determination is executed, and when defrosting of the vehicle-cabin-exterior condenser 17 and the vehicle-cabin-exterior vaporizer 27 have both been completed by "defrosting operation control 1" and "defrosting operation control 2", the procedure moves to step S41 and the defrosting operation is completed.

Therefore, according to the present embodiment, the following actions and effects are exhibited. In the heat-pump-type vehicle air conditioning system 1 according to the present embodiment, the vehicle-cabin-interior condenser 8 installed on the downstream side of the vehicle-cabin-interior vaporizer 7 within the HVAC unit 2 via the refrigerant switching means 16, and the vehicle-cabin-exterior vaporizer 27 installed outside the vehicle cabin on the exit side refrigerant pipe 22B of the vehicle-cabin-exterior condenser 17 via the second decompression unit 26 with on-off valve function are connected to a conventionally known refrigeration cycle for cabin cooling that includes the electric compressor 15, the vehicle-cabin-exterior condenser 17, the receiver 18, the first decompression unit 19 with on-off valve function, the vehicle-cabin-interior vaporizer 7, and the accumulator 21. In addition, the bypass circuit 32 having the third decompression unit 30 with on-off valve function is connected between the exit-side liquid refrigerant pipe 22B of the vehicle-cabin-exterior condenser 17 and the accumulator 21.

In this way, it is possible to configure the heat pump cycle for cabin heating 33 via the electric compressor 15, the refrigerant switching means 16, the vehicle-cabin-interior condenser 8, the liquid refrigerant pipe 22B, the second decompression unit 26 with on-off valve function, the vehicle-cabin-exterior vaporizer 27, and the accumulator 21. Likewise, during cabin heating operation, when the vehicle-cabin-exterior vaporizer 27 is frosted, the two defrosting circuits can be configured: the first defrosting circuit 34 and the second defrosting circuit 35. The first defrosting circuit 34 defrosts snow and ice and the like on the vehicle-cabin-exterior condenser 17 by circulating hot gas refrigerant from the electric compressor 15 through the bypass circuit 32 that includes the vehicle-cabin-exterior condenser 17, the liquid refrigerant pipe 22B, and the third decompression unit 30 with on-off valve function via the refrigerant switching means 16, and the accumulator 21. The second defrosting circuit 35 that defrosts frost on the vehicle-cabin-exterior vaporizer 27 by circulating hot gas refrigerant from the electric compressor 15 through the vehicle-cabin-exterior condenser 17, the liquid refrigerant pipe 22B, the second decompression unit 26 with on-off valve function, the vehicle-cabin-exterior vaporizer 27 via the refrigerant switching means 16, and the accumulator 21.

Therefore, the vehicle-cabin-exterior condenser 17 and the vehicle-cabin-exterior vaporizer 27 can be efficiently defrosted in a short period of time even under low outside air temperature conditions by introducing hot gas refrigerant output from the electric compressor 15 to the vehicle-cabin-exterior condenser 17 and the vehicle-cabin-exterior vaporizer 27 via the first defrosting circuit 34 and the second defrosting circuit 35, even when the vehicle-cabin-exterior vaporizer 27 is frosted or snow or ice or the like is adhering to the vehicle-cabin-exterior condenser 17 as a result of cabin heating operation during low outside temperature conditions, when the vehicle is stopped (parked) and the driver is not present but the vehicle power source (battery) is being charged or charging is completed.

Moreover, virtually all the refrigerant circuit and sub-assemblies of current air conditioning systems for vehicles applied to engine-powered vehicles can be used as they are. Therefore, by adding the minimum cabin heating circuit and equipment, the highly reliable and high-efficiency heat-pump-type vehicle air conditioning system 1 with the comparatively simple configuration, low cost, excellent mountability, and that can be ideally adopted for EV vehicles, HEV, and PHEV vehicles and the like can be provided.

Even when the vehicle-cabin-exterior vaporizer 27 is frosted as a result of cabin heating operation under low outside air temperature conditions, it is possible to switch to hot gas cabin heating in which the cabin is heated by the hot gas cycle 33A in which hot gas refrigerant from the electric compressor 15 is fed to the vehicle-cabin-interior condenser 8, and the refrigerant that is liquefied after releasing the heat in the vehicle-cabin-interior condenser 8 is passed through the bypass circuit 32, the third decompression unit 30, the check valve 31, and the accumulator 21, and is absorbed into the electric compressor 15, so cabin heating operation can continue as it is. Therefore, by being able to switch to defrosting operation during cabin heating operation, the problem of stopping the cabin heating operation and power consumption losses are resolved, the occurrence of fogging of the windows as a result of stopping the cabin heating operation is avoided, and it is possible to ensure the cabin heating effect and safety.

Defrosting operation is carried out after the vehicle has stopped and the driver is not present, and while the vehicle battery is being charged or after it has been charged, so it is possible to avoid the effect of the defrosting operation on the distance that the vehicle is driven, and defrosting operation can be carried out when the vehicle battery is being charged or after it has been charged when there is spare battery capacity. Therefore, the vehicle-cabin-exterior condenser 17 and the vehicle-cabin-exterior vaporizer 27 can be defrosted efficiently and reliably without affecting the driver in any way.

In the present embodiment, the receiver 18 is provided on the exit side refrigerant pipe 22B of the vehicle-cabin-exterior condenser 17, and the first decompression unit 19 with on-off valve function provided on the inlet side of the vehicle-cabin-interior vaporizer 7 is a solenoid valve-equipped temperature-driven automatic expansion valve. Therefore, the temperature-driven automatic expansion valve can be used in combination with the receiver, so the evaporation performance of the vehicle-cabin-interior vaporizer 7 can be stabilized, the controllability and reliability thereof can be ensured, the cabin cooling performance can be increased, and the configuration around the HVAC unit 2 where the solenoid valve-equipped temperature-driven automatic expansion valve is installed and the control system thereof can be simplified.

In the present embodiment, in the state in which the refrigerant is circulated in the heat pump cycle for cabin heating 33, by opening the on-off valve function of the first decompression unit 19 with on-off valve function on the inlet side of the vehicle-cabin-interior vaporizer 7, and closing both the vehicle-cabin-interior vaporizer 7 and the vehicle-cabin-exterior vaporizer 27 or the second decompression unit 26 with on-off valve function so that refrigerant flows only to the vehicle-cabin-interior vaporizer 7, the dehumidification mode can be selected. Therefore, during cabin cooling or cabin heating operation, the dehumidification mode can be selected if necessary, and it is possible to switch to dehumidification operation in which the vehicle-cabin-interior condenser 8 functions as a heat radiator and either both the vehicle-cabin-exterior vaporizer 27 and the vehicle-cabin-interior vaporizer 7 or the vehicle-cabin-interior vaporizer 7 only function as evaporator, and carry out temperature adjustment control.

In this way, during cabin cooling or cabin heating operation, it is possible to switch as appropriate to dehumidification mode and control the temperature, and execute comfortable dehumidification operation. During this dehumidification operation, by using both the vehicle-cabin-exterior vaporizer 27 and the vehicle-cabin-interior vaporizer 7, the temperature linearity performance (the capability of tracking the setting temperature) can be improved.

In the present embodiment, the vehicle-cabin-exterior vaporizer 27 is disposed in the air flow path of the vehicle-cabin-exterior fan 24 of the vehicle-cabin-exterior condenser 17 on the downstream side of the vehicle-cabin-exterior condenser 17, and during defrosting operation using the first defrosting circuit 34 and the second defrosting circuit 35, the vehicle-cabin-exterior fan 24 is stopped. Therefore, the vehicle-cabin-exterior fan 24 is used in common by both the vehicle-cabin-exterior condenser 17 and the vehicle-cabin-exterior vaporizer 27, so the configuration of the system can be simplified and the cost is reduced. The vehicle-cabin-exterior condenser 17 and the vehicle-cabin-exterior vaporizer 27 are defrosted by heating from the interior with hot gas refrigerant, so during defrosting operation using the first defrosting circuit 34 and the second defrosting circuit 35, defrosting can be carried out with the vehicle-cabin-exterior fan 24 stopped, and the power consumption for the defrosting operation can be reduced.

During the defrosting operation, after the snow or frozen water that has been sprayed up and is adhering to the vehicle-cabin-exterior condenser 17 has been defrosted by the first defrosting circuit 34 using the hot gas refrigerant, the circuit is switched to the second defrosting circuit 35, and the frosting of the vehicle-cabin-exterior vaporizer 27 is defrosted by the hot gas refrigerant. Therefore, hot gas refrigerant is fed in a concentrated manner separately to the vehicle-cabin-exterior condenser 17 and the vehicle-cabin-exterior vaporizer 27, so they can be successively defrosted. Therefore, even under low outside air temperature conditions, the vehicle-cabin-exterior condenser 17 and the vehicle-cabin-exterior vaporizer 27 can be efficiently defrosted in a short period of time.

Note that the present invention is not limited to the invention according to the embodiment as described above, and changes can be made as appropriate without departing from the gist thereof. For example, in the embodiment as described above, during heat pump cabin heating operation, even if the vehicle-cabin-exterior vaporizer 27 is frosted, in the case where the defrosting operation is not carried out while the vehicle is being driven but the frost is naturally defrosted while the vehicle is being driven, the heat pump cabin heating operation may be restored using the vehicle-cabin-exterior vaporizer 27. In the embodiment as described above, the first decompression unit 19 with on-off valve function on the inlet side of the vehicle-cabin-interior vaporizer 7 is a temperature-driven automatic expansion valve with good controllability that can ensure stable performance of the vehicle-cabin-interior vaporizer 7, and the receiver 18 is provided on the outlet of the vehicle-cabin-exterior condenser 17 in order to ensure the controllability, but if decompression means other than the temperature-driven automatic expansion valve is used, the receiver 18 may be omitted.

In the embodiment as described above, the first decompression unit 19 with on-off valve function is a solenoid valve-equipped temperature-driven automatic expansion valve, but a configuration in which a solenoid valve and the temperature-driven automatic expansion valve are connected in series may be used. In the case of the second decompression unit 26 with on-off valve function and the third decompression unit 30 with on-off valve function, the second on-off valve (solenoid valve) 25 and the third on-off valve (expansion valve) 29 are provided on the inlet side of the second decompression unit (expansion valve) 26 and the third decompression unit (expansion valve) 30 respectively, but these may be replaced with electronic expansion valves with on-off valve function, and these forms are also included within the present invention.

REFERENCE SIGNS LIST

1 Heat-pump-type vehicle air conditioning system
2 HVAC unit
7 Vehicle-cabin-interior vaporizer
8 Vehicle-cabin-interior condenser
15 Electric compressor
16 Refrigerant switching means (three-way switching valve)
17 Vehicle-cabin-exterior condenser
18 Receiver
19 First decompression unit with on-off valve function (solenoid valve-equipped temperature-driven automatic expansion valve)
21 Accumulator
22A Discharge pipe (Discharge circuit)
22B Liquid refrigerant pipe
23 Refrigerant cycle for cabin cooling (refrigerant circuit)
24 Vehicle-cabin-exterior fan
26 Second decompression unit with on-off valve function (on-off valve 25 and expansion valve 26)
30 Third decompression unit with on-off valve function (on-off valve 29 and expansion valve 30)
32 Bypass circuit
33 Heat pump cycle for cabin heating (refrigerant circuit)
33A Hot gas cycle
34 First defrosting circuit
35 Second defrosting circuit

The invention claimed is:

1. A heat-pump-type vehicle air conditioning system, comprising:
a refrigeration cycle for cabin cooling in which an electric compressor, a vehicle-cabin-exterior condenser, a first decompression unit with on-off valve function, a vehicle-cabin-interior vaporizer provided within a HVAC unit, and an accumulator are connected in this order;
a vehicle-cabin-interior condenser provided on a downstream side of the vehicle-cabin-interior vaporizer within the HVAC unit, and having a refrigerant inlet connected to a discharge circuit of the electric compressor via switching means, and a refrigerant outlet connected to an exit-side liquid refrigerant pipe of the vehicle-cabin-exterior condenser;
a vehicle-cabin-exterior vaporizer having a refrigerant inlet connected to an exit-side liquid refrigerant pipe of the vehicle-cabin-exterior condenser, and a refrigerant outlet connected to the accumulator; and
a bypass circuit that includes a third decompression unit with on-off valve function connected between the exit-side liquid refrigerant pipe of the vehicle-cabin-exterior condenser and the accumulator,
the switching means switching to a state introducing a refrigerant output from the electric compressor to the vehicle-cabin-interior condenser while the vehicle is powered and switching to a state introducing the refrigerant output from the electric compressor directly to the vehicle-cabin-exterior condenser while the vehicle is turned off,
a heat pump cycle for cabin heating being able to be configured from the electric compressor, the switching means, the vehicle-cabin-interior condenser, the liquid refrigerant pipe, a second decompression unit with on-off valve function, the vehicle-cabin-exterior vaporizer, and the accumulator, and
during cabin heating operation, when the vehicle-cabin-exterior vaporizer is frosted, a first defrosting circuit that defrosts the vehicle-cabin-exterior condenser being able to be configured by circulating hot gas refrigerant from the electric compressor through the bypass circuit that includes the vehicle-cabin-exterior condenser, the liquid refrigerant pipe, and the third decompression unit with on-off valve function, and the accumulator via the switching means, and a second defrosting circuit that defrosts the vehicle-cabin-exterior vaporizer being able to be configured by circulating hot gas refrigerant from the electric compressor through the vehicle-cabin-exterior condenser, the liquid refrigerant pipe, the second decompression unit with on-off valve function, the vehicle-cabin-exterior vaporizer, and the accumulator via the switching means.

2. The heat-pump-type vehicle air conditioning system according to claim 1, wherein during cabin heating operation by the heat pump cycle for cabin heating, when frosting of the vehicle-cabin-exterior vaporizer is detected, cabin heating operation can be continued by switching to a hot gas cycle in which refrigerant that has been condensed after releasing heat in the vehicle-cabin-interior condenser is passed through the bypass circuit that includes the third decompression unit with on-off valve function and is introduced into the accumulator, and absorbed into the electric compressor.

3. The heat-pump-type vehicle air conditioning system according to claim 1, wherein a receiver is provided on the exit-side liquid refrigerant pipe of the vehicle-cabin-exterior condenser, and the first decompression unit with on-off valve function on the inlet side of the vehicle-cabin-interior vaporizer is a solenoid valve-equipped temperature-driven automatic expansion valve.

4. The heat-pump-type vehicle air conditioning system according to claim 1, wherein a dehumidification mode can be selected when the refrigerant is being circulated in the heat pump cycle for cabin heating by opening the on-off valve function of the first decompression unit with on-off valve function on the inlet side of the vehicle-cabin-interior vaporizer, and closing either both the vehicle-cabin-interior vaporizer and the vehicle-cabin-exterior vaporizer or the second decompression unit with on-off valve function so that the refrigerant flows into the vehicle-cabin-interior vaporizer.

5. The heat-pump-type vehicle air conditioning system according to claim 1, wherein the vehicle-cabin-exterior vaporizer is disposed in the air flow path of a vehicle-cabin-exterior fan of the vehicle-cabin-exterior condenser and on the downstream side of the vehicle-cabin-exterior condenser, and configured so that during defrosting operation using the first defrosting circuit and the second defrosting circuit, the vehicle-cabin-exterior fan is stopped.

6. A defrosting method of the heat-pump-type vehicular air-conditioning system according to claim 1, comprising: when the vehicle-cabin-exterior vaporizer is frosted, defrosting snow or frozen water that has been sprayed up and adhering to the vehicle-cabin-exterior condenser side via the first defrosting circuit using hot gas refrigerant; switching to the second defrosting circuit; and defrosting the frost of the vehicle-cabin-exterior vaporizer with hot gas refrigerant.

7. The defrosting method of a heat-pump-type vehicular air-conditioning system according to claim 6, wherein the defrosting operation is carried out after the vehicle has stopped while the vehicle battery is being charged or after the vehicle battery has been charged, and the vehicle-cabin-exterior fan is stopped.

\* \* \* \* \*